US012478299B2

(12) United States Patent
Barr et al.

(10) Patent No.: US 12,478,299 B2
(45) Date of Patent: Nov. 25, 2025

(54) HAND WARMER DEVICE FOR CAPILLARY BLOOD COLLECTION

(71) Applicant: Babson Diagnostics, Inc., Austin, TX (US)

(72) Inventors: Roy Barr, Austin, TX (US); Eric Olson, Austin, TX (US); Anagata Vishaka Anand, Austin, TX (US); Jacob Benjamin Hochfelder, Cambridge, MA (US); Orhun Ogun Davarci, Pflugerville, TX (US); Kristen Michelle Gentry, San Diego, CA (US); Paige Marie Matthews, Houston, TX (US); Craig Sandlin, Cedar Creek, TX (US)

(73) Assignee: Babson Diagnostics, Inc., Austin, TX (US)

( * ) Notice: Subject to any disclaimer, the term of this patent is extended or adjusted under 35 U.S.C. 154(b) by 0 days.

(21) Appl. No.: 18/333,181

(22) Filed: Jun. 12, 2023

(65) Prior Publication Data

US 2023/0404450 A1 Dec. 21, 2023

Related U.S. Application Data

(60) Provisional application No. 63/352,505, filed on Jun. 15, 2022.

(51) Int. Cl.
*A61B 5/15* (2006.01)
*A61F 7/00* (2006.01)

(52) U.S. Cl.
CPC .. *A61B 5/150076* (2013.01); *A61B 5/150022* (2013.01); *A61F 2007/0036* (2013.01);
(Continued)

(58) Field of Classification Search
CPC .................... A61B 5/150076; A61B 5/150022
See application file for complete search history.

(56) References Cited

U.S. PATENT DOCUMENTS

2003/0069509 A1* 4/2003 Matzinger ........ A61B 5/150358
600/583
2005/0008354 A1* 1/2005 Cassidy .................. F24H 15/37
392/494
(Continued)

FOREIGN PATENT DOCUMENTS

CN 108743197 A 11/2018
CN 114159058 A 3/2022
(Continued)

OTHER PUBLICATIONS

English (Machine) Translation of JP 2019/47893A (Year: 2019).*
(Continued)

*Primary Examiner* — Daniel L Cerioni
(74) *Attorney, Agent, or Firm* — COOLEY LLP

(57) ABSTRACT

A device that can warm a hand of a user and/or patient to facilitate collection of blood samples (e.g., capillary blood sample collection) is described herein. The device provides controlled amounts of heat directed to the palm of a user and/or patient to facilitate collection of high-quality capillary blood samples. The device is designed in such a way to provide a comfortable resting position for the hand that allows heating the hand of the user and/or patient while simultaneously providing access to the finger of the user and/or patient to carry out one or more steps in preparation for collection of capillary blood samples from the finger. The device will also monitor the temperature to limit the max temperature to a safe level, control the palm temperature to a desired level, and use a conductive material to enable rapid heating.

27 Claims, 9 Drawing Sheets

(52) U.S. Cl.
CPC ............... *A61F 2007/0071* (2013.01); *A61F 2007/0095* (2013.01)

(56) References Cited

U.S. PATENT DOCUMENTS

| | | | | |
|---|---|---|---|---|
| 2005/0070777 | A1* | 3/2005 | Cho | G01K 3/10 |
| | | | | 600/326 |
| 2007/0112400 | A1* | 5/2007 | Hamilton | A61F 7/02 |
| | | | | 607/104 |
| 2011/0040316 | A1* | 2/2011 | Pottala | A61B 5/150618 |
| | | | | 606/182 |
| 2016/0151010 | A1* | 6/2016 | Erez | A61B 5/15115 |
| | | | | 600/576 |
| 2016/0374853 | A1* | 12/2016 | Grahn | A61F 7/08 |
| | | | | 607/104 |
| 2020/0261308 | A1 | 8/2020 | Zhou | |
| 2021/0015699 | A1 | 1/2021 | Zou et al. | |
| 2021/0312836 | A1* | 10/2021 | Case | A61M 1/02 |
| 2022/0117778 | A1 | 4/2022 | Knotts | |

FOREIGN PATENT DOCUMENTS

| | | | |
|---|---|---|---|
| EP | 3888721 | A1 | 10/2021 |
| JP | 2019-47893 | A * | 3/2019 |
| WO | WO-2019006349 | A1 | 1/2019 |
| WO | WO-2023244984 | A1 | 12/2023 |

OTHER PUBLICATIONS

International Search Report and Written Opinion for PCT Application No. PCT/US2023/068316 dated Sep. 13, 2023, 14 pages.

Restriction Requirement for U.S. Appl. No. 18/333,181 dated Aug. 17, 2023, 6 pages.

International Preliminary Report on Patentability for International Application No. PCT/US2023/068316 mailed Dec. 26, 2024, 8 pages.

* cited by examiner

300

Receive, at a heat exchange surface of a housing, a palm of a hand of a user, such that at a distal end portion of at least one finger of the hand extends beyond the heat exchange surface and is spaced from the housing when the palm is in contact with the heat exchange surface
301

Convey heat, via the heat exchange surface, to the palm when the palm is in contact with the heat exchange surface, such that blood can be collected from the distal end portion of the at least one finger during the conveying heat to the palm
302

Measure a temperature of a proximal end portion of the at least one finger while heat is being conveyed to the palm
303

Measure a temperature of the heat exchange surface while heat is being conveyed to the palm
304

Collect blood from the distal end portion of the at least one finger when the palm is in contact with the heat exchange surface and while heat is being conveyed to the palm
305

FIG. 9

HAND WARMER DEVICE FOR CAPILLARY BLOOD COLLECTION

CROSS REFERENCE TO RELATED APPLICATIONS

This application claims priority to and the benefit of U.S. Provisional Patent Application No. 63/352,505 filed Jun. 15, 2022, entitled "Hand Warmer Device for Capillary Blood Collection," the disclosure of which is incorporated by reference herein in its entirety.

TECHNICAL FIELD

The present disclosure relates to devices and methods for increasing the temperature of a hand and/or a finger of a subject to facilitate collection of capillary blood samples.

BACKGROUND

Capillary blood sampling is a technique in which blood is sampled from a puncture on a finger, heel or an earlobe of a patient. Capillary blood sampling can offer several advantages over traditional venous blood sampling, including use of much less invasive procedures to collect the samples, the simplicity of the procedure, and the availability of multiple collection sites on the human body. Despite these advantages, collection of capillary blood samples present technical challenges, particularly related to the need for short collection times. The use of relatively long times during collection of capillary blood samples can lead to poor quality samples due to development of microclots, platelet clumping at the incision site made by a lancet, and/or extended exposure to open atmosphere allowing for undesired gas exchange to occur. Consequently, there is a need to develop devices and methods that can overcome the current limitations by shortening the time required to collect capillary blood samples.

SUMMARY

Devices for heating and/or warming a hand of a user and/or patient to facilitate collection of capillary blood samples are described herein. In some embodiments, an apparatus for warming a hand of a user comprises: a housing, and a heat source. The housing includes a palm receiving portion and a finger receiving portion. The palm receiving portion has a heat exchange surface and is configured to receive the hand of the user such that at least a finger of the hand extends beyond the palm receiving portion and across the finger receiving portion. The finger receiving portion is disposed adjacent to the palm receiving portion and configured to accommodate a proximal end portion of the at least one finger of the hand in a predetermined orientation. The heat source being disposed in the housing and operably coupled to the heat exchange surface. The heat source is disposed in the housing and is configured to generate heat to warm the hand via the heat exchange surface when the hand is in contact with the heat exchange surface In some embodiments, an apparatus for warming a hand of a user comprises: a housing configured to receive the hand of the user, and heat source. The housing includes: a finger receiving component and a palm receiving component. The finger receiving component defines a trench. The trench is configured to accommodate a proximal end portion of a finger of the hand of the user such that a distal end portion of the finger of the hand of the user is accessible for collecting a blood sample. The palm receiving component is disposed adjacent to the finger receiving component and includes a heat exchange surface configured to receive a palm of the hand of the user. The heat source is disposed in the housing and operably coupled to the heat exchange surface. The heat source is configured to heat the palm of the hand of the user via the heat exchange surface.

BRIEF DESCRIPTION OF THE DRAWINGS

FIG. 9 is a flow chart of an example method of operating and/or using a hand warmer device for aiding capillary blood collection according to an embodiment.

DETAILED DESCRIPTION

Figure 1:
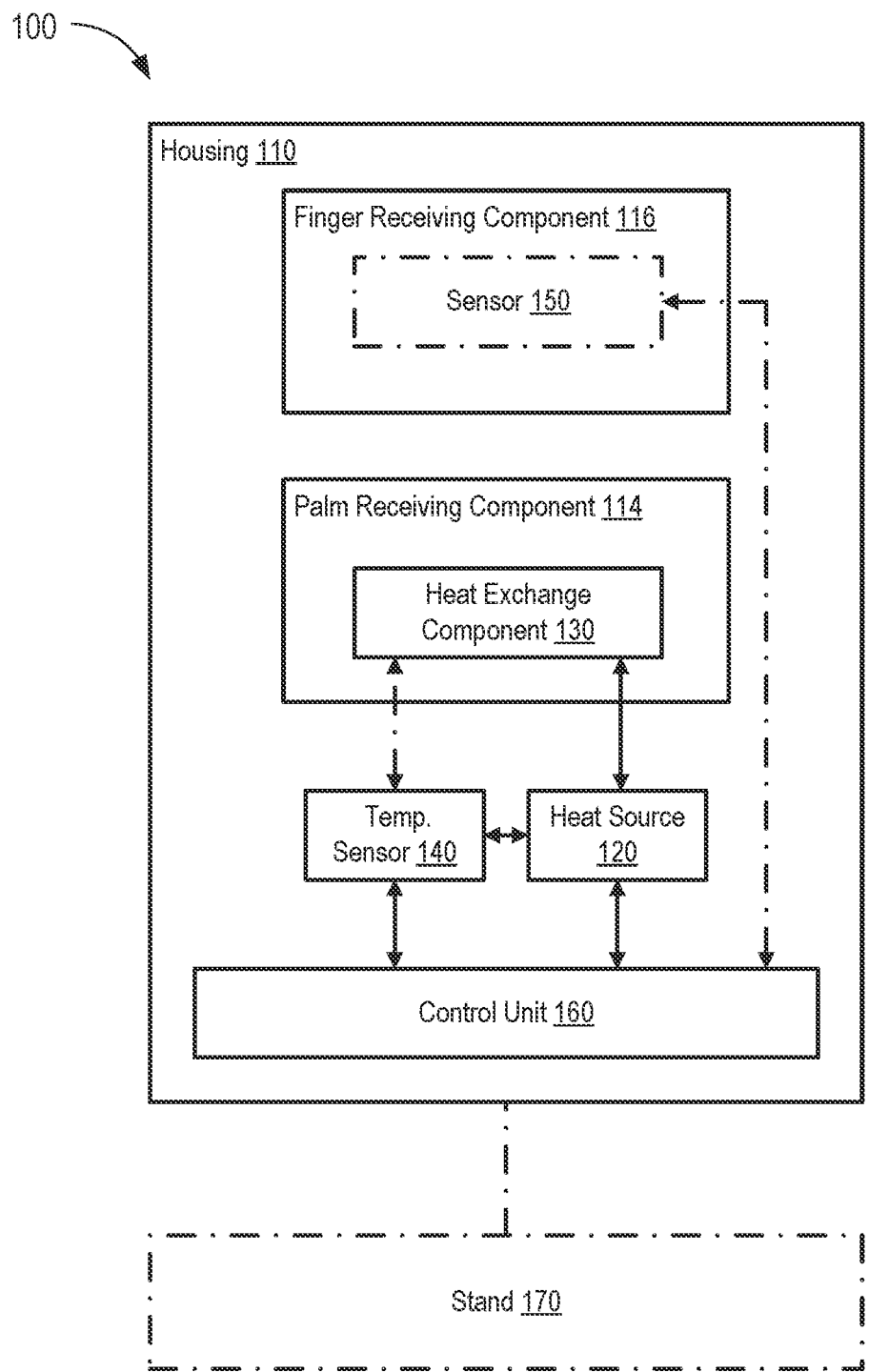
FIG. 1 a schematic illustration of a hand warmer device for aiding capillary blood collection according to an embodiment

The embodiments described herein relate generally to blood sample collection, and more particularly to hand warmer devices that can increase the temperature of the hand and/or fingers of a patient to facilitate and/or aid the collection of capillary blood samples.

Capillaries are small vessels formed by branching of arteriole. In the skin, capillaries can be easily found near the surface, and can be accessed by puncturing the dermis layer of the skin. The simplicity of the procedure, and the availability of multiple sites for collecting samples makes this approach highly attractive, particularly for infants, and/or individuals which require multiple blood tests to be done frequently. Moreover, in some instances capillary blood samples can be a cost-effective approach to obtain blood samples and perform multiple diagnostic tests since the procedure can be done directly by a user and/or patient at his or her home, avoiding the need for a trained phlebotomist and their associated costs. Despite these advantages, use of capillary blood samples present difficulties associated with the time required to collect the samples. High quality capillary blood samples require rapid collection (e.g., short blood sample collection times) in order to avoid undesired complications such as development of microclots, platelet clumping at the incision site made by a lancet, and/or extended exposure to open atmosphere allowing for undesired gas exchange to occur. Capillary blood samples can be particularly challenging for individuals which may be slow bleeders, and thus require extended amounts of time to collect a given volume of blood.

It is traditionally well accepted that heating the fingers of a user and/or patient can ease and/or facilitate the process of collecting capillary blood samples. Without wishing to be bound by any particular theory, addition of controlled amounts of heat to the palm of a user and/or patient has been suggested to facilitate stimulating venous plexuses and arteriovenous anastomoses (AVAs) of the heat exchange vascular units, which respond to the application of heat by increasing blood flow to regulate the body temperature. The increased blood flow can expedite blood collection and thus facilitate collection of high-quality capillary blood samples. Current solutions for warming a site for collection of capillary samples include electric heating blankets, warm moist towels, asking the patient to rub their hands together or wash their hands in lukewarm water. These solutions are limited, in that they can take minutes to warm the hand, the application of heat is not precisely controlled and not directed to the specific area required, and do not provide access to the finger during and/or immediately following the warming, such that other preparation steps and collection can occur while heat is being applied.

Systems and devices described herein address the limitations of existing technologies by providing a device that can provide a controlled amount of heat to the palm of a hand of a user and/or patient. The devices and methods disclosed herein provide controlled amounts of heat applied. The devices are designed to deliver controlled amounts of heat such that the entire process is reproducible and reliable. Moreover, the devices disclosed herein, have been designed to allow a hand to be warmed while other preparation steps take place such as selection of blood sample collection site, disinfection of the blood sample collection site, piercing of the of the finger, application of a suitable collection mechanism, and/or the actual collection of blood. The devices described herein can significantly decrease the amount of time required to complete the blood collection process, eliminating any delay between heat application and blood sample collection, and yielding benefits for the user and/or patient, and the retail site providing the service.

As used in this specification and/or any claims included herein the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations FIG. 1 shows a schematic illustration of a hand warmer device 100 according to an embodiment. The hand warmer device 100 (also referred to herein as "warmer device" 100) can be configured to provide a surface on which a hand of a user and/or patient can be received and heated for the purpose of facilitating collection of capillary blood samples. The warmer device 100 can include a housing 110, a heat source 120, a heat exchange component 130, a temperature sensor 140, and a control unit 160. Optionally, in some embodiments the warmer device 100 can also include a sensor 150, and a removably couplable stand 170. The housing 110 can define one or more volumes and/or chambers for accommodating (e.g., housing, containing, supporting, etc.) one or more components of the warmer device 100, while providing one or more surfaces on which a hand of a user and/or patient can be received, accommodated, and/or supported such that the hand can be heated, and simultaneously be subject to one or more blood sample preparation steps including selection of a blood sample collection site (e.g., a distal end portion of a finger of the hand), disinfection of the blood sample collection site, piercing of the collection site, application of a suitable collection mechanism (e.g., a collar and/or any other suitable structure that can facilitate withdrawing blood), and the actual collection of capillary blood samples. In some implementations, for example, a user's palm can rest on the housing 110 during warming of the palm, while allowing at least one finger to extend beyond an edge of the housing 110 (e.g., overhang), to then allow for simultaneous preparation of and collection from the finger. As depicted in FIG. 1, the housing 110 can accommodate the heat source 120, the heat exchange component 130, the temperature sensor 140, the optional sensor 150, and the control unit 160. The heat source 120 can be any suitable component configured to generate and release thermal energy for heating a hand of the user. The heat source 120 can be coupled with the heat exchange component 130 to convey the heat generated by the heat source 120. The heat exchange component 130 can be disposed on the housing 110 and define a surface (e.g., a heat exchange surface 130) configured to be placed in direct contact with a hand of the user and/or patient to transfer the heat received from the heat source 120 to the hand of the user and/or patient.

The temperature sensor 140 can be operatively coupled with the heat source 120 and the control unit 160 to measure a temperature of the heat source 120 and communicate the measured temperature to the control unit 160. In this way, the control unit 160 can control and/or regulate the temperature of the heat source 120 to allow the rapid heating of the heat exchange component 130 (or the heat exchange surface 130) to a predetermined target temperature. For example, in some embodiments the control unit 160 can control and/or regulate the temperature of the heat source 120 to allow heating the heat exchange component 130 (or the heat exchange surface 130) to a target temperature within a period of time about 30 seconds, as further described herein. Furthermore, the temperature sensor 140 can facilitate controlling the heating rate of the heat source 120 to avoid overshooting (e.g., exceeding the predetermined target temperature) and ensure a short sample collection time (e.g., avoiding extended periods of time needed to stabilize the temperature of the heat exchange component 130 (or the heat exchange surface 130) at the desired predetermined target temperature). For example, in some embodiments the temperature sensor 140 can be coupled to the control unit 160 to prevent overshooting the intended target temperature by less than 2 degrees Celsius. In some embodiments, the temperature sensor 140 can be additionally and/or alternatively coupled with the heat exchange surface 130 and the control unit 160 to measure and/or control the temperature of the heat exchange surface 130, as further described herein. The optional sensor 150 can be disposed on a surface of the housing such that the sensor 150 can measure one or more physiological, environmental and/or physical parameters on the user and/or patient. For example, in some implementations the sensor 150 can include a temperature sensor that can be used to measure a temperature of a finger of the hand of the user (or at least the temperature of a portion of the finger) being heated to determine an optimal time when capillary blood samples can be collected from the finger of the hand of the user and/or patient. In some instances, the optimal time to collect blood samples can be associated to a predetermined absolute temperature of the finger (or a portion thereof) of the of the hand being heated, as measured by the sensor 150. In other instances, the optimal time to collect blood samples can be associated to a relative temperature change (e.g., a percentage temperature change with respect to the initial temperature of the hand, or the finger of the hand), or to a rate of temperature change. In some implementations, the sensor 150 can include load and/or force sensors, pressure sensors, electrocardiogram (ECG) sensors, photoplethysmography (PPG) sensors, light sensors, and/or the like. The data generated by the optional sensor 150 can be used to determine information about the user and/or patient, including, for example: heart rate, heart rate variability, blood flow velocity, pulse transit time, blood pressure, blood oxygenation levels (e.g., SpO$_2$), respiration rate, etc.

The housing 110 can be any suitable structure configured to define oner or more internal volumes and/or chambers for disposing one or more components of the warmer device 100. For example, in some embodiments the housing 110 includes a single internal volume and/or chamber in which multiple components such as the heat source 120, the temperature sensor 140, the sensor 150, and the control unit 160 can be accommodated. Alternatively, in some embodiments the housing 110 can include multiple internal volumes and/or chambers configured to house any suitable combination or distribution of specific components of the warmer device 100. The housing 110 can be any suitable shape and/or size sufficient to provide one or more surfaces for receiving a hand of a user and/or patient from which capillary blood samples can be collected (e.g., a blood sample collection hand). In some implementations the housing 110 can be a prism-like three-dimensional shape having any suitable cross-sectional area including, for example, a circle, a square, and/or a rectangle, and a suitable height. In some implementations the housing 110 can be a cube or the like having rounded or non-rounded edges, corners, etc. In some implementations the housing can be a curved shape configured to adjust to the anatomic shape of a blood sample collection hand of a user and/or patient. Moreover, in some implementations the housing 110 can have a shape, surface features, and/or surface material or finishes configured increase the ergonomics of the warmer device 100 such that a user and/or patient can be comfortable while one or more capillary blood samples are collected from one of his/her blood sample collection hand.

The housing 110 can be shaped and/or configured to achieve a desired positioning and/or orientation of the blood sample collection hand, such that a user and/or patient can comfortably place his/her blood sample collection hand on the housing 110 to heat the hand and facilitate and/or ease capillary blood sample collection, while simultaneously allowing a trained healthcare worker and/or technician to initiate other steps of the capillary blood sample collection process such as for example, selecting and preparing the appropriate sample collection tube(s), cleaning and/or disinfecting the blood sample collection area, and/or apply pressure to the area which will be pierced to collect the capillary blood sample. In that way, the warmer device 100 can facilitate reducing the total amount of time needed to collect a capillary blood sample preventing potential contamination and/or formation of cloths due to a slow blood collection process.

The housing 110 can be made of any suitable material or materials having sufficient structural strength and rigidity to support the hand of the user, including, for example, metal, glass, ceramic, and/or polymers. In some implementations, the housing 110 can include multiple portions that can be coupled and/or assembled together to form one or more chambers and/or compartments for receiving the components of the warmer device 100. That is, in some implementations, the housing 110 can be modular. Alternatively, in other implementations, the housing 110 can be made of a monolithic structure.

As depicted in FIG. 1, the housing 110 includes a palm receiving portion and/or component 114, and a finger receiving portion and/or component 116. The palm receiving component 114 can be a region of the housing 110 disposed on an external surface of the housing 110 sized and configured to receive and/or support the palm of a blood sample collection hand of a user and/or patient. The palm receiving component 114 can be shaped and sized to receive a right-hand palm and/or a left-hand palm of a user and/or patient. The palm receiving component 114 includes an area and/or region in which the heat exchange component 130 (and thus the heat exchange surface 130) can be disposed, allowing intimate contact between the heat exchange surface 130 and the palm of a blood sample collection hand. In use, the user and/or patient can accommodate one of his/her hands (e.g., the blood sample collection hand) on the warmer device 100 such that the palm of the blood sample collection hand is disposed over the palm receiving component 114 and in direct contact with the heat exchange surface 130. In that way, the palm of the blood sample collection hand can receive heat generated from the heat source 120 and transferred to the palm via the heat exchange surface 130 of the heat exchange component 130.

The finger receiving component 116 can be disposed on an external surface of the housing 110, adjacent to the palm receiving component 114. The finger receiving component 116 can be a region of the housing 110 disposed on an external surface of the housing 110 sized and configured to receive and/or accommodate at least a portion of a finger from the blood sample collection hand of a user and/or patient disposed on the adjacent palm receiving component 114. The finger receiving component 116 can be sized and shaped to receive a finger (or a portion thereof) from a left hand and/or from a right-hand of a user and/or patient. In some implementations the finger receiving component 116 can be sized and shaped to receive different types of fingers from a user and/or patient. For example, in some implementations the finger receiving component 116 can be sized and shaped to receive and accommodate a thumb finger, an index finger, a middle finger, a ring finger and/or a little finger from the user and/or patient. In other implementations the finger receiving component 116 can be sized and shaped to receive a specific type of finger from a user. For example, in some implementations the finger receiving component 116 can be sized and shaped to receive an index finger from a patient.

The finger receiving component 116 can have an elongated shape that extends outward (e.g., overhangs) from the contour volume of the housing 110. In use, the finger receiving component 116 can receive and support a finger of a hand of a subject in an extended position and/or predetermined orientation) such that the proximal end portion of the finger is accommodated on the finger receiving component 116 and the end portion of the finger (e.g., the distal end portion including the fingernail) is positioned away from the warmer device 100. In the predetermined orientation the distal end-portion of the finger extends away from the warmer device 100 and provides sufficient space and/or access to allow a technician and/or a trained healthcare worker to perform one or more steps on the finger prior to conducting collection of capillary blood samples, while the palm of the hand is being heated to aid in blood collection. Furthermore, the predetermined orientation can also provide sufficient space to allow a technician to initiate and conduct the collection of the blood samples. For example, in some instances the technician and/or trained healthcare worker can disinfect the end-portion of the finger in preparation for a piercing the skin of the finger with a lancet, while the palm of the hand is being heated to increase the temperature at the fingers, and then pierce the skin of the finger to collect high quality blood samples. The finger receiving component 116 can be configured to receive the finger (or a portion thereof) of a user according to a predetermined orientation that leaves and/or generates a repeatable and/or reproducible space for a technician to perform the steps required to collect blood samples. In that way, every time a user disposes a finger on the finger receiving component 116, the finger is received in the predetermined orientation such that the end-portion of the finger leaves sufficient space for the technician and/or trained healthcare worker to perform the steps required for collection of blood samples. In some implementations the finger receiving component 116 can be adjustable to accommodate different digits of the user's hand, and/or various patient sizes; while in some embodiments, the finger receiving component 116 can be fixed or stationary.

The finger receiving component 116 can be configured to house and/or accommodate a sensor 150. The sensor 150 can be configured to measuring and/or monitoring a temperature of the finger (or a portion thereof), as further described herein. The sensor 150 can be configured to measure a temperature of the finger (or a portion thereof) while the heat exchange component 130 transfers heat to the blood sample collection hand via the heat exchange surface 130. The temperature measured on the finger can serve as a surrogate measurement of the temperature of the blood sample collection hand and/or the readiness to start the blood collection process. In use, a user and/or patient can place one of his/her hands (e.g., the blood sample collection hand) on the warmer device 100 such that the palm of the hand is disposed on the palm receiving component 114 (and thus in direct contact with the heat exchange surface 130), and a finger of the hand (or a portion thereof) is disposed on the finger receiving component 116. The heat source 120 can generate heat which can be transferred to the palm of the hand via the heat exchange surface 130. The sensor 150 can be configured to measure a temperature of the finger (or a portion thereof) until the finger reaches a predetermined value that serves as a surrogate for the temperature of the hand and/or the readiness to start the blood collection process. When the temperature measured by the sensor 150 reaches the predetermined value the warmer device 100, the heat source 120 can interrupt the generation of heat, and/or the warmer device 100 can indicate to the user and/or patient (via the control unit 160) that the blood sample collection hand is ready for collecting capillary blood samples.

In some implementations, the finger receiving component 116 can include one or more guides and/or marks that delineate, demarcate, and or define a region in which the finger needs to be placed during the capillary blood sample collection process. For example, the guides and/or marks of the finger receiving component 116 can include two creases, protuberances, ridges, bulges and/or the like disposed on the surface of the housing 110 and oriented parallel to each other such that the creases enclose an area and/or region between them in which a finger of the blood sample collection hand can be disposed. In some implementations the guides and/or marks of the finger receiving component 116 can include multiple lines printed on the surface of housing 110 forming the contour shape of a finger to indicate the position and/or orientation that a finger of a blood sample collection hand can assume when the blood sample collection hand is disposed on the warmer device 100. In some implementations the guides and/or marks of the finger receiving component 116 can define one or more grooves, trenches, channels or the like that delineate the area and/or region on which a finger of the blood sample collection hand can be disposed.

As described above, the finger receiving component 116 can provide an opening and/or chamber suitable for housing the sensor 150, such that the sensor 150 can be used to measure a temperature of the finger. In some implementations, the finger receiving component 116 can include an aperture, opening, orifice, and/or window in which the sensor 150 can be disposed. The aperture of the finger receiving component 116 can be any suitable shape and/or size. In some implementations the aperture of the finger receiving component 116 can be a circular opening of a size substantially similar to the size of the finger of the user and/or patient. Alternatively, in other embodiments the aperture of the finger receiving component 116 can any suitable geometrical shape such as triangular, rectangular, and/or polygonal shape of a size substantially smaller than the average size of the finger of the blood sample collection hand of a user and/or patient.

In some implementations the housing 110 can include an electrical interface (not shown). The electrical interface can be any suitable connector, adapter, interface, etc. that can be coupled to an external power source (not shown). The electrical interface can be configured to be electrically coupled and/or connected to and/or otherwise placed in electric communication with the external power source to provide a flow of electric power to one or more components of the warmer device 100 such as the heat source 120, the temperature sensor 140, and/or the control unit 160. In this context, the terms "electrically coupled," "electrically connected," and "electric communication" are intended to refer to any suitable direct or indirect connection, coupling, and/or mode of conveyance that allows a flow of electric power or current from the external power source to the electrical interface suitable for powering, at least partially, components of the warmer device 100. The electrical interface may be adaptable to a variety of international voltage and/or current standards. In some implementations the housing 110 can accommodate and/or house an internal power source such as energy storage devices (batteries), a solar panel, and/or the like, configured to provide electric power to the one or more components of the warmer device 100.

The heat source 120 can be any suitable device configured to generate and/or release heat and facilitate transferring the generated heat (via a heat exchange surface 130) to a blood sample collection hand of a user and/or patient. The heat source 120 can be any suitable resistive heater configured to flow an electrical current to convert electrical energy into heat through the Joule heating process. In some implementations the heat source 120 can be a film heater including a metal and/or metal alloy wire embedded in a substrate film of a flexible material. In such implementations the metal wire and/or the substrate film can be configured to impart various characteristics including light weight, flexibility, ability to be bent to conform to irregular shapes, contours, and/or three-dimensional shapes and/or curvatures, high temperature uniformity, quick thermal response, low thermal mass, low energy consumption, high watt density, and/or wide range of voltage compatibility. In some implementations the heat source 120 can be a film heater include one or more wires made of a metal and/or metal alloy material such as, for example, Copper (Cu), Nickel Chromium (NiCr) alloys, Iron Chromium Aluminum (FeCrAl) alloys, Copper Nickel (CuNi) alloys and the like. The film heater 120 can also include one or more substrate films made of materials such as polyethylene terephthalate (PET), polyimides, silicon rubber, layers and the like, in which the wires can be embedded and/or etched. In some implementations the film heater 120 can include a thin film coated on the resistive heater and configured to act as a protective insulating layer. Alternatively, in some implementations the heat source 120 can include an open coil heater comprising an exposed resistance wire such as a NiCr wire encased between two or more ceramic insulators. In yet other implementations, the heat source 120 can include a metal sheath heater comprising a resistance wire encased inside a metal sheath and surrounded with a layer of compacted Magnesium Oxide (MgO) insulation.

The heat source 120 can be disposed within the housing 110 on a location adjacent to and/or in direct physical contact with the heat exchange component 130 such that the heat generated by the heat source 120 can be efficiently transferred and/or transported from the heat source 120 to the heat exchange component 130 and then to the hand of a user and/or patient via the heat exchange surface 130. That is, the heat source 120 can be mechanically coupled to the heat exchange component 130, as shown in FIG. 1. In some implementations the heat source 120 can be disposed in the housing 110 right underneath the heat exchange component 130 and directly attached and/or adhered to a posterior surface of the heat exchange component 130. In such embodiments, heat generated by the heat source 120 can be transferred via one or more of a conductive, convective and/or radiation mechanism, from the heat source 120 to the posterior surface of the heat exchange component 130 opposite to the heat exchange surface 130. Heat can then be transported and/or diffused by conductive mechanisms throughout the heat exchange component 130 to the heat exchange surface 130 in which the hand of a user and/or patient is disposed on. In some implementations the heat source 120 can be electrically and/or operatively coupled to the control unit 160 such that the control unit 160 can activate and/or control the operation of the heat source 120 to generate an amount of heat that can be used to heat and/or increase a temperature of a blood sample collection hand of a user and/or patient, as further described herein. As depicted in FIG. 1, the heat source 120 can be coupled to the temperature sensor 140 to measure a temperature of the heat source 120. In some implementations the temperature sensor 140 can be configured to measure a temperature of the heat source 120 and send one or more signals to the control unit 160 such that the control unit 160 can adjust and/or modify the rate of generation of heat in the heat source 120, effectively controlling the temperature of the heat source 120 and the rate of heat transfer from the heat source 120 to the heat exchange component 130 (e.g., facilitating increasing, decreasing and/or maintaining constant the temperature of the heat exchange surface 130), as further described herein.

The heat exchange component 130 can be any suitable structure defining a heat exchange surface (e.g., the heat exchange surface 130) capable of transferring heat from the heat source 120 to a blood sample collection hand of a user and/or patient. In some implementations the heat exchange component 130 can be a panel, plate, sheet, layer slab and/or leaf made of a material having high thermal conductivity and configured to be coupled to the heat source 120 to facilitate heat transfer from the heat source 120 to a blood sample collection hand. In some implementations the heat exchange component 130 can be a plate made of material possessing high thermal conductivity including, but not limited to, aluminum (Al), aluminum nitride ($AlNiO_3$) copper (Cu), tungsten (W), silicon carbide (SiC), gold (Au), silver (Ag), graphite, and/or Zinc (Zn). The heat exchange component 130 can be disposed on a surface of the housing 110, and more specifically, on a surface of the palm receiving component 114, as shown in FIG. 1. The heat exchange component 130 can be disposed on an external surface of the palm receiving component 114, positioned directly above and/or on top of the heat source 120 (e.g., attached and/or in intimate contact with the heat source 120) such that heat generated by the heat source 120 can be efficiently transferred to a hand of a user and/or patient disposed on the palm receiving component 114 by heat conduction, convection and/or radiation. In such implementations, the heat exchange component 130 can define a posterior surface disposed in intimate contact with the heat source 120 and configured to facilitate transfer of heat generated by the heat source 120 via thermal conduction, convection, and/or radiation. Heat transferred from the heat source 120 can diffuse through the body of the heat exchange component 130 from the posterior surface to the heat exchange surface 130. The heat exchange surface 130 can be disposed in direct contact with a blood sample collection hand of a user and/or patient such that heat diffused through the heat exchange component 130 can be directed to the blood sample collection hand by thermal conduction and/or convection.

The heat exchange component 130 can be any suitable shape and size. For example, in some implementations the heat exchange component 130 can be panel having a thickness and a suitable cross-sectional area including circular, oval, square, rectangular, and/or other polygonal, or the like. Alternatively, in some implementations the heat exchange component 130 can be (or define an indent or recess in) the shape of human hand and/or a portion thereof. In some implementations the heat exchange component 130 can define a heat exchange surface 130 that is substantially larger than the surface of the palm of a blood sample collection hand. In other implementations, the heat exchange component 130 can define a heat exchange surface 130 that is smaller than the surface of the palm of the blood sample collection hand. In yet, other implementations, the heat exchange component 130 can define a heat exchange surface 130 that is about the same size as the surface of the palm of the blood sample collection hand. In such implementations, the heat exchange component 130 (and the heat exchange surface 130) are sized and shaped to heat a palm of a hand of a user. As depicted in FIG. 1, in some implementations the heat exchange component 130 can be optionally coupled to the temperature sensor 140 to measure a temperature of the heat exchange component 130 (or the heat exchange surface 130). In some implementations the temperature sensor 140 can be configured to measure a temperature of the heat exchange component 130, for example a temperature representative of the heat exchange surface 130. The temperature sensor 140 can measure a temperature and send one or more signals to the control unit 160 such that the control unit 160 can adjust and/or modify the rate of generation of heat in the heat source 120, effectively controlling the temperature of the heat exchange component 130 (e.g., increasing, decreasing and/or maintaining constant the temperature of the heat exchange surface 130), as further described herein.

The temperature sensor 140 can be any suitable device configured to measure the temperature of the heat exchange component 130. As described above, the temperature sensor 140 can be coupled to the heat source 120 to facilitate measuring a temperature of the heat source 120. Alternatively and/or optionally, in some implementations the temperature sensor 140 can be coupled to the heat exchange component 130 to facilitate measuring a temperature of the heat exchange component 130 (or the heat exchange surface 130). In some implementations the temperature sensor 140 can include a thermocouple, a resistance thermometer (RTD), a thermistor, an integrated circuit (IC) temperature or the like. The temperature sensor 140 can be electrically and/or operatively coupled to the control unit 160 such that the control unit 160 can activate and/or control the operation of the temperature sensor 140 to measure a temperature of the heat source 120 and/or the heat exchange component 130 and facilitate controlling the generation of heat at the heat source 120 as well as the heating and cooling of the heat exchange component 130 (or the heat exchange surface 130), as further described herein.

The sensor 150 can be any suitable sensor disposed on (or adjacent or otherwise in sufficient proximity to) the finger receiving component 116 and configured to measure a temperature of a finger from a blood collection hand of a user and/or patient. In some implementations the sensor 150 can be a thermal infrared (IR) sensor, disposed on the finger receiving component 116, and positioned and/or located at a short distance from the finger of blood sample collection hand disposed in the finger receiving component 116. In such implementations, the sensor 150 can be configured to measure the infrared energy emitting from the finger of a sample collection hand disposed on the finger receiving component 116 and estimate, based on the measured energy, a temperature of the finger. In some implementations, the sensor 150 can be a thermocouple, a resistance temperature detector (RTD), a thermistor, or a semiconductor based integrated circuit (IC). In some implementations the sensor 150 can be disposed on an opening, and/or port of the finger receiving component 116 such that the sensor 150 can be used to measure a temperature of a finger of the blood sample collecting hand of a user and/or patient. In some implementations, the opening and/or port of the finger receiving component 116 can be located on a region of the finger receiving component 116 such that the sensor 150 can measure a temperature of the finger at a predetermined location and/or point of the finger such as for example, between the first and/or the second knuckle of the hand.

The sensor 150 can be electrically and/or operatively coupled to the control unit 160 such that the control unit 160 can activate and/or control the operation of the sensor 150. In use the sensor 150 can be activated by the control unit 160 to take one or more measurements of the temperature of the finger of a blood sample collection hand. As described above, the temperature of the finger measured by the sensor 150 can be used as a surrogate measurement of the temperature of the blood sample collection hand and/or the readiness to start the blood collection process. The sensor 150 can be configured to communicate the temperature measured to the control unit 160. The control unit in turn can send signals to heat source 120 to increase and/or decrease the generation of heat, as further described herein.

The control unit 160 can be configured to activate and/or control the operation of one or more components of the warmer 100, e.g., by receiving electrical signal(s) from and/or sending electrical signal(s) to other components of the warmer device 100. The control unit 160 can include a memory, a processor, and an input/output (I/O) device.

The memory can be, for example, a random-access memory (RAM), a memory buffer, a hard drive, a database, an erasable programmable read-only memory (EPROM), an electrically erasable read-only memory (EEPROM), a read-only memory (ROM), and/or so forth. In some embodiments, memory stores instructions that cause processor to execute modules, processes, and/or functions associated with operating one or more components of the warmer 100.

The processor of the control unit 160 can be any suitable processing device configured to run and/or execute functions associated the warmer device 100. For example, processor can be configured to process and/or analyze sensor data (e.g., received from the sensor 150 and/or the temperature sensor 140), to adjust one or more parameters such as the amount of current passed through the heat source 120 (and thus the amount of heat generated by the heat source 120), adjust the duration (e.g., amount of time) that current is passed through the heat source 120 to heat the hand of a user, and/or determine the temperature of the finger being measured by the sensor 150. In some implementations the processor can receive signals (e.g., temperature data) from the sensor 150 associated with a temperature of a finger (or a portion of thereof) disposed on the finger receiving component 116. The processor can be configured to analyze the temperature data and determine a time in which one or more blood samples can be collected from a user and/or patient, as further described herein. The processor of the control unit 160 can be a general-purpose processor, a Field Programmable Gate Array (FPGA), an Application Specific Integrated Circuit (ASIC), a Digital Signal Processor (DSP), and/or the like The input/output (I/O) device of the control unit 160 can include one or more components for receiving information and/or sending information to other components of the warmer 100. In some implementations, the (I/O) device can include a communication interface that can enable communication between the control unit 160 and the heat source 120, and/or the sensor 150. In some implementations, the I/O device can also include a communication interface that can enable communication between the control unit 160 and a user, patient, and/or a trained healthcare worker. In such implementations, the user can use the interface of the I/O device to input one or more instructions to the warmer device 100 and/or initiate one or more methods and/or predetermined procedures stored in the memory of the control unit 160. For example, a user can use the interface of the I/O device to initiate heating the blood sample collection hand according to a predetermined procedure. Optionally, in some implementations the I/O device can include a network interface that can enable communication between the control unit 160 and one or more external devices, including, for example, an external user device (e.g., a mobile phone, a tablet, a laptop) and/or other compute device (e.g., a local or remote compute, a server, etc.). The network interface can be configured to provide a wired connection with the external device, e.g., via a port or firewall interface, can be configured to communicate with the external device via a wireless network (e.g., Wi-Fi, Bluetooth®, low powered Bluetooth®, Zigbee and the like). In some implementations, the communication interface can also be used to recharge a power source (e.g., power source 120), e.g., a rechargeable battery. Furthermore, in some implementations the warmer device 100 can include a suitable power supply (e.g., a main battery, a solar power system, fuel cell or the like). For example, in some implementations the warmer device 100 can include one or more easily replaceable batteries that can be swapped to facilitate operating and/or using the warmer device 100 for long periods of time.

The control unit 160 can generate electrical signals to control one or more components of the warmer device 100, e.g., based on instructions stored in the memory of the control unit 160. These electrical signals may be communicated between the control unit 160 and other components of the warmer device 100 via a communication interface of I/O device. In some implementations the control unit 160 can generate one or more signals to drive the heat source 120. For example, the control unit 160 can generate an electrical current that can be passed through the heat source 120 to generate heat. The control unit 160 can also receive a signal (e.g., temperature data) from the sensor 150 and/or the temperature sensor 140 associated with a temperature of the finger (or apportion thereof) of the sample collecting hand of a user and/or patient, and a temperature of the heat source 120, respectively. In response, the control unit 160 can increase, decrease, and/or sustain the amount of electrical current passed through the heat source 120, with the purpose of controlling the temperature of the blood collection hand of the user and/or patient, as further described herein. In some implementations, the control unit 160 can receive one or more signals (e.g., temperature data) from the sensor 150 associated with a temperature of a finger (or apportion thereof) disposed on the finger receiving component 116 of the warmer device 1000 when a hand of a user and/or patient is being heated by the warmer device 100. The control unit 160 can be further configured to analyze the data collected by the temperature sensor to determine and/or establish information related to the collection of blood samples from the user. For example, the control unit 160 can determine, based on the temperature data, a time when one or more blood samples can be collected from the user and/or patient by for example, inserting a blood sample collection device on a proximal end of the finger disposed on the finger receiving component 116 on any other suitable blood sample collection point on the body of the user and/or patient. The control unit 160 can present the determined information related to the collection of blood samples to the patient and/or user via a display of the (I/O) device. For example, in some implementations the control unit 160 can turn on a light indicator and/or display disposed on the housing of the warmer device 100 to indicate to that blood samples may be collected from the patient and/or user. In some implementations, the warmer device 100 can include multiple light indicators and/or displays, with each light indicator and/or display being associated with the collection of a specific type of blood sample. For example, in some implementations the warmer device 100 can include a first light indicator and/or display having a predetermined color and/or shape associated with the collection of a first type of blood sample. The warmer device 100 can also include a second light indicator and/or display having a second predetermined color and/or shape (different from the first predetermined color and/or shape) associated with the collection of a second type of blood sample. The warmer device 100 can include additional light indicators and/or displays (e.g., a third, fourth, fifth and so on), with each light indicator and/or display having a predetermined color and/or shape associated with a specific type of blood sample to be collected. In some implementations, each light indicator and/or display of the warmer device 100 can be associated to the collection of a blood sample in a predetermined blood sample collection device. That is, in some implementations the warmer device 100 can include a first light indicator and/or display associated with the collection of blood samples using a first specific type of blood sample collection device (e.g., a blood sample collection device (and/or container) sized and configured for collection of a specific kind of blood sample that may require, for example clotting, centrifugation, or that may include a specific reagent required for further processing). The warmer device 100 can include a second light indicator and/or display associated with the collection of blood samples using a second specific type of blood sample collection device (different from the first type of blood sample collection device).

The optional stand 170 can be a structure configured to be reversibly coupled to the warmer device 100 to change, alter, and/or modify the position and/or the orientation of the palm receiving component 114 and the finger receiving component 116 with respect to the horizontal surface and/or ground over which the warmer device 100 is disposed on. More specifically, the stand 170 can be coupled to a bottom portion of the housing 110 (e.g., a portion of the housing 110 disposed in direct contact with the horizontal surface and/or ground) such that the distance and/or height between a reference point located on either the heat exchange component 130 or the finger receiving component 116 and the horizontal surface and/or ground is increased, as further described herein. The stand 170 can increase the overall height of the warmer device 100 such that when the warmer device 100 is placed on a table and/or any suitable horizontal surface the orientation of the hand of the user is changed and/or altered to improve the ergonomic characteristics of the warmer device 100. In that way, the use of the stand 170 can cause certain users can feel more comfortable while one of their hands (the blood sample collection hand) is being processed to obtain blood capillary samples. For example, in some instances users and/or patients may feel more comfortable and/or prefer placing one of their hands on a warmer device 100 disposed on a horizontal surface such as a table according to a low elevation orientation. In the low elevation orientation, the warmer device 100 is not coupled to the stand 170, and an arm of a user and/or patient can be extended horizontally against the surface of a table with the hand attached to that arm being disposed on top of the warmer device 100 in such a way that the arm becomes slightly elevated with respect to the table at the wrist portion of the arm. Said in other words, in the low elevation orientation, the arm of the patient is oriented forming a small angle with respect to the table in which the warmer device 100 is disposed, and the distance between the reference point located on the finger receiving component 116 (or on the heat exchange component 130) and the ground assumes a low value or magnitude.

Alternatively, in some instances users and/or patients may feel more comfortable and/or prefer disposing one of their hands on a warmer device 100 according to a high elevation orientation. In the high elevation orientation, the warmer device 100 is coupled to the stand 170, and the arm of the user and/or patient can be extended horizontally against the surface of a table with the hand attached to that arm being disposed on top of the warmer device 100 in such a way that the elbow region of the arm touches the table, and the wrist region of the arm is disposed elevated with respect to the table. Said in other words, in the large height orientation, the arm of the patient is oriented forming a large angle with respect to the table in which the warmer device 100 is disposed, and the distance between the reference point located on the finger receiving component 116 (or the heat exchange component 130) and the ground assumes a high value or magnitude, as further described herein.

In some implementations the stand 170 can be a platform, podium, and/or stage that can be removably coupled to a lower portion of the warmer device 100 to increase the overall distance and/or height between the surface over which the warmer device 100 is disposed (e.g., a table and/or the ground) and the heat exchange component 130. The increased distance and/or height between the ground and the heat exchange component 130 (or the heat exchange surface 130) can alter the angle of the arm that a user and/or patient has to assume in order to heat the hand and collect capillary blood samples. The stand 170 can be any suitable shape and/or size. For example, in some implantations the stand 170 can be a three-dimensional structure having a height and any suitable cross-sectional area including, for example, a circle, a square, and/or a rectangle, and a suitable height. In some implementations the stand 170 can be a cube or the like having rounded or non-rounded edges, corners, etc. In other implementations, the stand 170 can include one or more legs. The stand 170 can be made of any suitable material or materials having sufficient structural strength and rigidity, including, for example, metal, glass, ceramic, and/or polymers. In some implementations, the stand 170 can include multiple portions that can be coupled and/or assembled together to form a structure capable of supporting the weight of the warmer device 100. That is, in some implementations, the stand 170 can be modular. Alternatively, in other implementations, the stand 170 can be made of a monolithic structure. In some implementations the stand 170 can include one or more coupling features that facilitate attaching the stand 170 to the warmer device 100. For example, in some implementations the stand 170 can include a first set of magnetized couplings disposed on an exterior surface of the stand 170. The first set of magnetized couplings can be mechanically coupled to a second set of magnetized couplings. The first and the second magnetized couplings can be reversibly coupled/decoupled to increase the height and/or overall dimensions of the hand warmer 100.

As described above, the warmer device 100 can be used to heat a hand of a user with the purpose of increasing the temperature of the hand and/or a finger of the user and facilitating collecting high quality capillary blood samples. A a user, and/or a patient can place one of his/her hands on the warmer device 100 oriented in such a way that the palm of the hand is disposed on the palm receiving component 114 and at least one of the fingers of the hand is disposed on the finger receiving component 116. The warmer device 100 can then receive one or more set of instructions from a trained healthcare worker, or from the user and/or patient via the I/O device of the control unit 160. In some instances, the set of instructions can cause the warmer device 100 to increase the temperature of the heat source 120 from an initial temperature (e.g., room temperature or initial temperature) to a predetermined target temperature, and then keep the heat source 120 at that predetermined target temperature. The heat source 120 can transfer generated heat to the heat exchange component 130 (and/or the heat exchange surface 130) to warm and/or heat the hand of the user and/or patient, facilitating collection of high-quality capillary blood samples.

In some implementations the trained healthcare worker, user and/or patient can input a set of instructions and/or commands which cause the control unit 160 to communicate (e.g., by sending and receiving signals) with the heat source 120 and the temperature sensor 140. The control unit 160 can send one or more signal to the heat source 120 to cause the heat source 120 to flow an electric current and generate heat. The control unit 160 can also cause the temperature sensor 140 to measure a temperature of the heat source 120 and send a signal representative of the measured temperature to the control unit 160. In that way, the control unit 160 can control the heating of the heat source 120 in a closed loop configuration. Alternatively and/or optionally, in some implementations the temperature sensor 140 can be coupled to the heat exchange surface 130. In such implementations, the control unit 160 can be configured to cause the temperature sensor 140 to measure a temperature of the heat exchange component 130 and send a signal representative of the measured temperature of the heat exchange component 130 to the control unit 160. In that way, the control unit 160 can monitor the temperature of the heat exchange component 130 and adjust the temperature of the heat source 120 to either increase and/or decrease the rate of heat generation and/or heat transfer to the heat exchange component 130. In some instances, the trained healthcare worker, user, and/or patient can input a set of instructions to cause the heat source 120 to be heated from room temperature to a predetermined target temperature. The temperature sensor 140 can measure the temperature of the heat source 120 and send signals to the control unit 160 such that the control unit 160 can adjust the amount of heat generated by the heat source 120 until the heat source 120 reaches the predetermined target temperature. The heat source 120 can be mechanically coupled to the heat exchange component 130 such that heat generated by the heat source can be efficiently and rapidly transferred to the heat exchange surface 130. In that way, the temperature of the heat source 120 can be adjusted and/or manipulated to indirectly control the temperature of the heat exchange component 130 avoiding large constant feedback loops. Once the heat source 120 reaches the predetermined target temperature (and thus the heat exchange component 130), the control unit 160 can send one or more signal via the interface of the I/O device of the control unit 160 to maintain the heat source 120 at the predetermined target temperature while the hand of the user and/or patient is being warmed and/or heated, as further described herein.

In some implementations, the warmer device 100 can be configured to increase the temperature of the heat source 120 from an initial temperature (e.g., room temperature or initial temperature (e.g., above room temperature) to a predetermined target temperature. In some implementation the predetermined target temperature can be no more than about 50° C., no more than about 45° C., no more than about 40° C., no more than about 38° C., no more than about 36° C., no more than about 34° C., no more than about 32° C., no more than about 30° C., no more than about 28° C., inclusive of all values and ranges therebetween. In some implementations, the warmer device 100 can be configured to increase the temperature of the heat source 120 from an initial temperature (e.g., room temperature or initial temperature) to a predetermined target temperature of at least about 28° C., at least about 32° C., at least about 36° C., at least about 40° C., at least about 44° C., at least about 48° C., at least about 50° C., at least about 54° C., inclusive of all values and ranges therebetween. In some implementations, the warmer device 100 can be configured to heat the heat source 120 at a predetermined heating rate. For example, in some implementations the warmer device 100 can heat the heat source 120 at a heating rate of no more than about 45° C./min, no more than about 40° C./min, no more than about 35° C./min, no more than about 30° C./min, no more than about 25° C./min, no more than about 20° C./min, no more than about 15° C./min, no more than about 10° C./min, no more than about 5° C./min, inclusive of all values and ranges therebetween. In some implementations the warmer device 100 can heat the heat source 120 at a heating rate of at least about 5° C./min, at least about 12° C./min, at least about 18° C./min, at least about 24° C./min, at least about 30° C./min, at least about 36° C./min, at least about 42° C./min, inclusive of all values and ranges therebetween.

In some instances, the trained healthcare worker, user, and/or patient can input a set of instructions such that the control unit 160 maintains the temperature of the heat source 120 (and thus the temperature of the heat exchange component 130) at a predetermined target temperature while the hand of the user and/or patient is being warmed and/or heated, and during the subsequent blood collection process. For example, in some instances the trained healthcare worker, user, and/or patient can input a predetermined amount of time that the control unit 160 will maintain the temperature of the heat source 120 (after the heat source 120 has reached its predetermined target temperature) to warm and/or heat the hand of the user and/or patient prior to the blood collection process. When the predetermined amount of time has passed, the control unit 160 can send a signal via the I/O device of the control unit 160 to inform the user and/or patient that the hand has been warmed and is now reading to initiate collection of capillary blood samples. The control unit 160 can also be configured to maintain the temperature of the heat source 120 (and thus the temperature of the heat exchange component 130) during the subsequent blood collection process, thus eliminating any delay between heat application and collection of blood.

In other instances, the trained healthcare worker, user and/or patient can input a desired temperature for the finger disposed on the finger receiving component 116 (and measured by the sensor 150), and the control unit 160 will maintain the predetermined target temperature of the heat source 120 (and thus the temperature of the heat exchange component 130) until the finger reaches the desired temperature. Then the control unit 160 will stop heating the warmer 100. Once the finger reaches the desired temperature, the control unit 160 can send a signal via the I/O device of the control unit 160 to inform the user and/or patient that the hand has been warmed and is now reading to initiate collection of capillary blood samples.

In yet other instances, the trained healthcare worker, user and/or patient can input a temperature percent change based on the initial and/or starting temperature of the finger disposed on the finger receiving component 114 measured by the sensor 150. For example, in some instances a trained healthcare worker, user and/or patient can input to the control unit 160 a 20% temperature change with respect to the starting temperature of the finger. The control unit can send a signal to the sensor 150 to measure the initial temperature of the finger of the user disposed on the finger receiving component 116. The control unit can receive a signal from the sensor 150 representative of the measured initial temperature of the finger. Then the control unit 160 can send a signal to the heat source 120 to heat the heat source 120 (and thus the heat exchange component 130) to a predetermined target temperature. The control unit 160 can continuously communicate with the heat source 120 and the temperature sensor 140 to heat and/or increase the temperature of the heat source 120 until reaching the predetermined target temperature. The control unit 160 can also receive signals from the sensor 150 representative of the temperature of the finger disposed on the finger receiving component 116. When the temperature of the finger reaches a 20% temperature increase measured with respect to the initial temperature of the finger, the control unit 160 can send a signal via the I/O device of the control unit 160 to inform the user and/or patient that the hand has reached the selected temperature % change, and thus the hand has been warmed and is now reading to initiate collection of capillary blood samples. In some instances, the trained healthcare worker, user and/or patient can input a rate of change of the finger temperature measured by the sensor 150. For example, in some instances the trained healthcare worker, user and/or patient can input a rate of change of the finger temperature of about 0.2° C./sec. The control unit 160 can send a signal to the heat source 120 to heat the heat source 120 to the predetermined target temperature. The control unit 160 can continuously communicate with the heat source 120 and the temperature sensor 140 to heat and/or increase the temperature of the heat source 120 (and thus the temperature of the heat exchange component 130) until reaching the predetermined target temperature. The control unit 160 can also receive signals from the sensor 150 representative of the rate of change of the finger temperature. When the rate of change of the finger temperature is met and/or exceeded, the control unit 160 can send a signal via the I/O device of the control unit 160 to inform the user and/or patient that the finger has reached and/or exceeded the selected rate of heating of the finger, and thus the hand has been warm and is now reading to initiate collection of capillary blood samples. In some instances, the trained healthcare worker, user, and/or patient can input a rate of change of the heating rate of the finger temperature. That is, the pace at which the heating rate changes or accelerates during heating of the finger. For example, in some instances the trained healthcare worker, user, and/or patient can input a rate of change of the heating rate of about 0.1° C./sec per second (e.g., the heating rate changes from 0.2° C./sec to 0.3° C./sec in one second). The control unit 160 can send a signal to the heat source 120 to heat the heat source 120. The control unit 160 can continuously communicate with the heat source 120 and the temperature sensor 140 to heat and/or increase the temperature of the heat source 120 (and thus the temperature of the heat exchange component 130) until reaching the predetermined target temperature. The control unit 160 can also receive signals from the sensor 150 representative of the pace at which the heating rate of the finger is changing (e.g., the second derivate of the change of temperature with respect to time during heating of the finger). When the pace at which the heating rate changes is met and/or exceeded, the control unit 160 can send a signal via the I/O device of the control unit 160 to inform the user and/or patient that the finger has reached and/or exceeded the selected pace of heating rate of the finger, and thus the hand has been warm and is now reading to initiate collection of capillary blood samples. In some implementations, the warmer device 100 can be configured such that the control unit 160 can send a signal via the I/O device of the control unit 160 to the user to inform the user and/or patient that a particular number of criteria (e.g., at least one, two or more, three or more, etc.) from the criteria described above have been met and thus the hand has been sufficiently warmed and is now ready to initiate collection of capillary blood samples. For example, in some implementations the warmer device 100 can be configured to inform the user and/or patient that the hand has been warmed and is now ready to initiate collection of capillary blood samples only when (1) a predetermined amount of time has passed, and/or (2) the temperature of the finger reaches a certain predetermined % temperature increase measured with respect to the initial temperature of the finger. In other implementations the warmer device 100 can be configured to inform the user and/or patient that the hand has been warmed and is now ready to initiate collection of capillary blood samples only when (1) the temperature of the finger reaches a certain predetermined % temperature increase measured with respect to the initial temperature of the finger, (2) a predetermined rate of change of the finger temperature (e.g., a heating rate) is reached and/or exceeded, and/or (3) a predetermined pace at which the heating rate changes (e.g., a rate of change of the heating rate, or heating rate acceleration) is met and/or exceeded.

It is worth noting that the design of the housing 110 and the finger receiving component 116 allows a technician and/or trained healthcare worker to complete one or more steps associated with the capillary blood sample collection process while at the same time the hand is being warmed, as described above.

Figure 2:
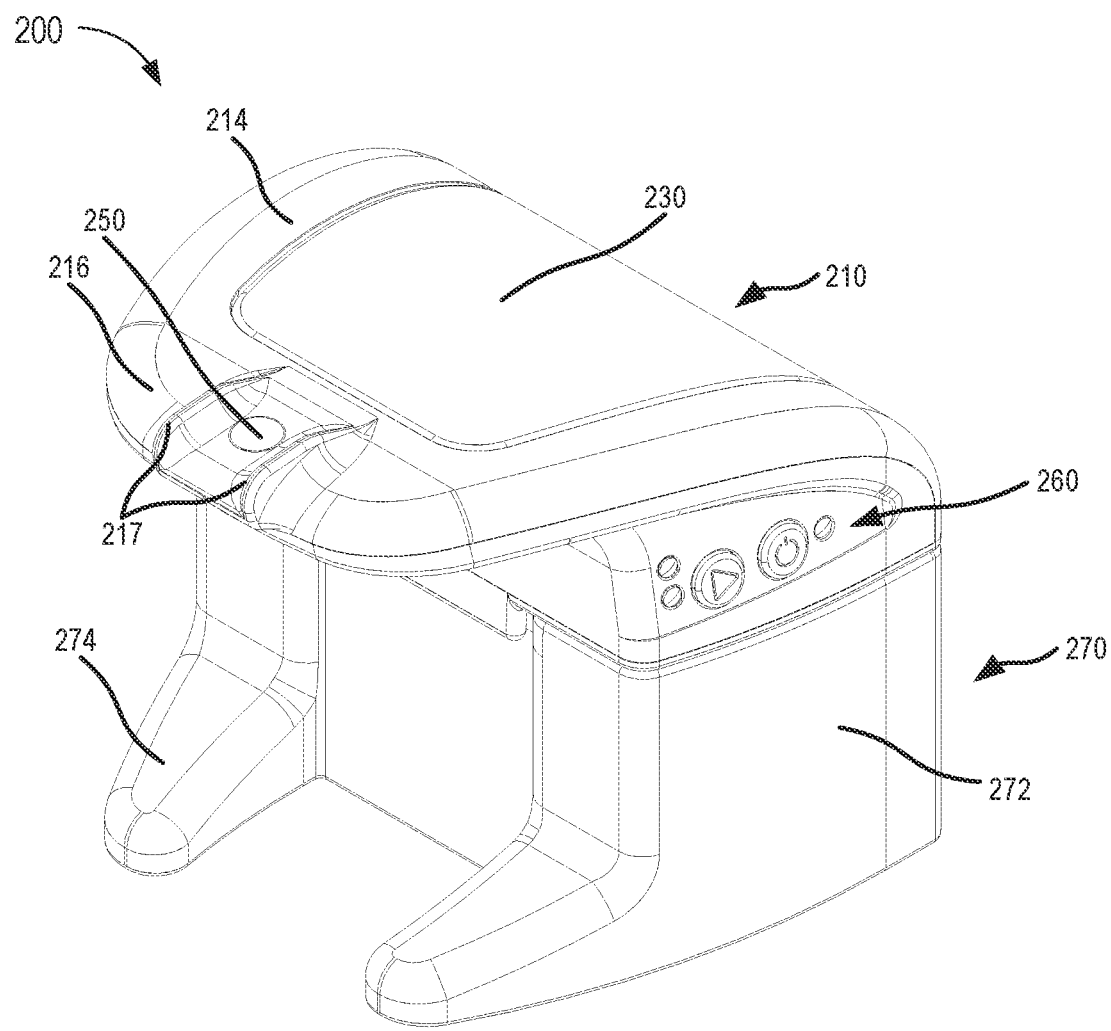
FIG. 2 is a perspective view of a hand warmer device for aiding capillary blood collection according to an embodiment.
Figure 3:
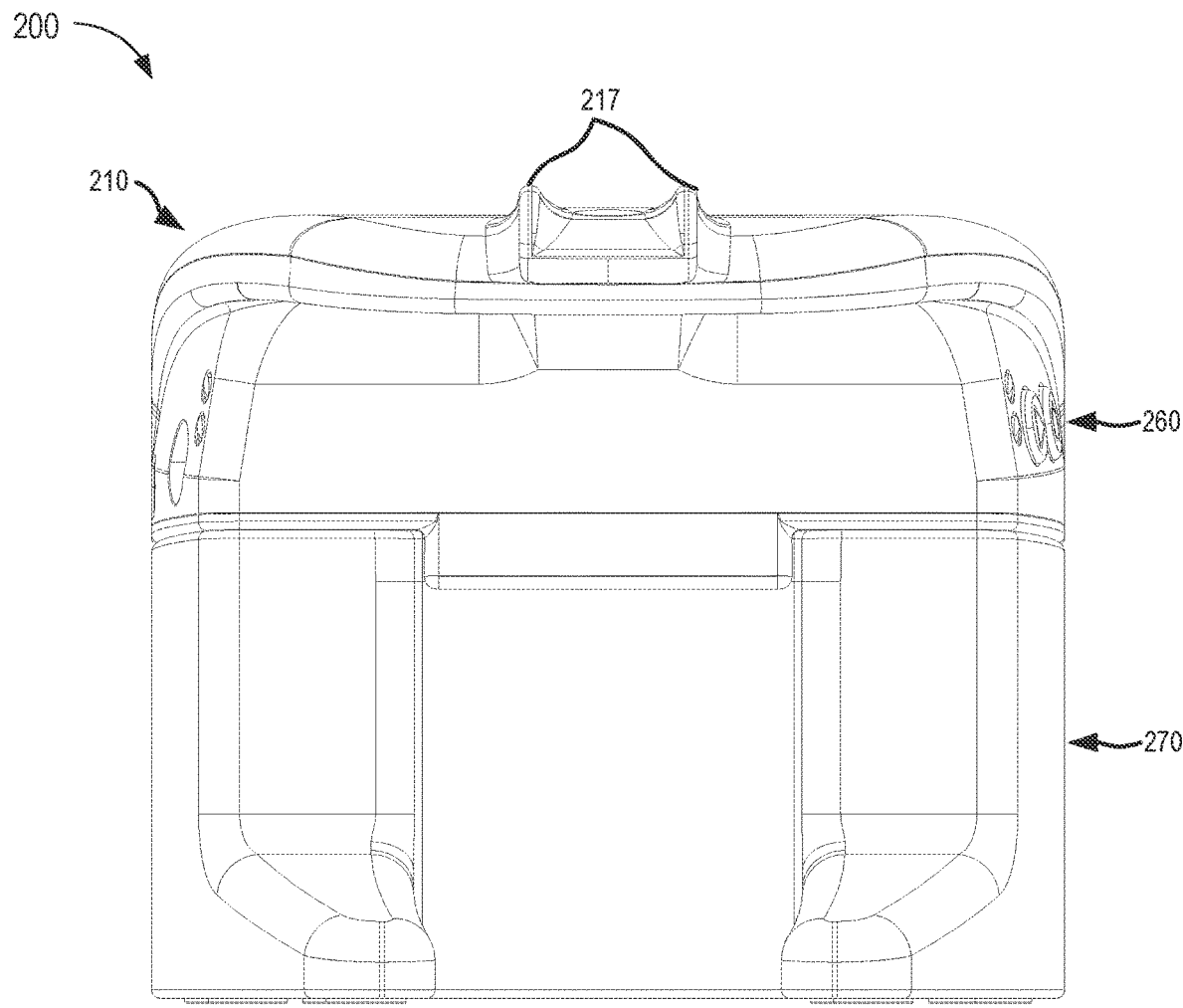
FIG. 3 is a front view of the hand warmer device for aiding capillary blood collection shown in FIG. 2.
Figure 4:
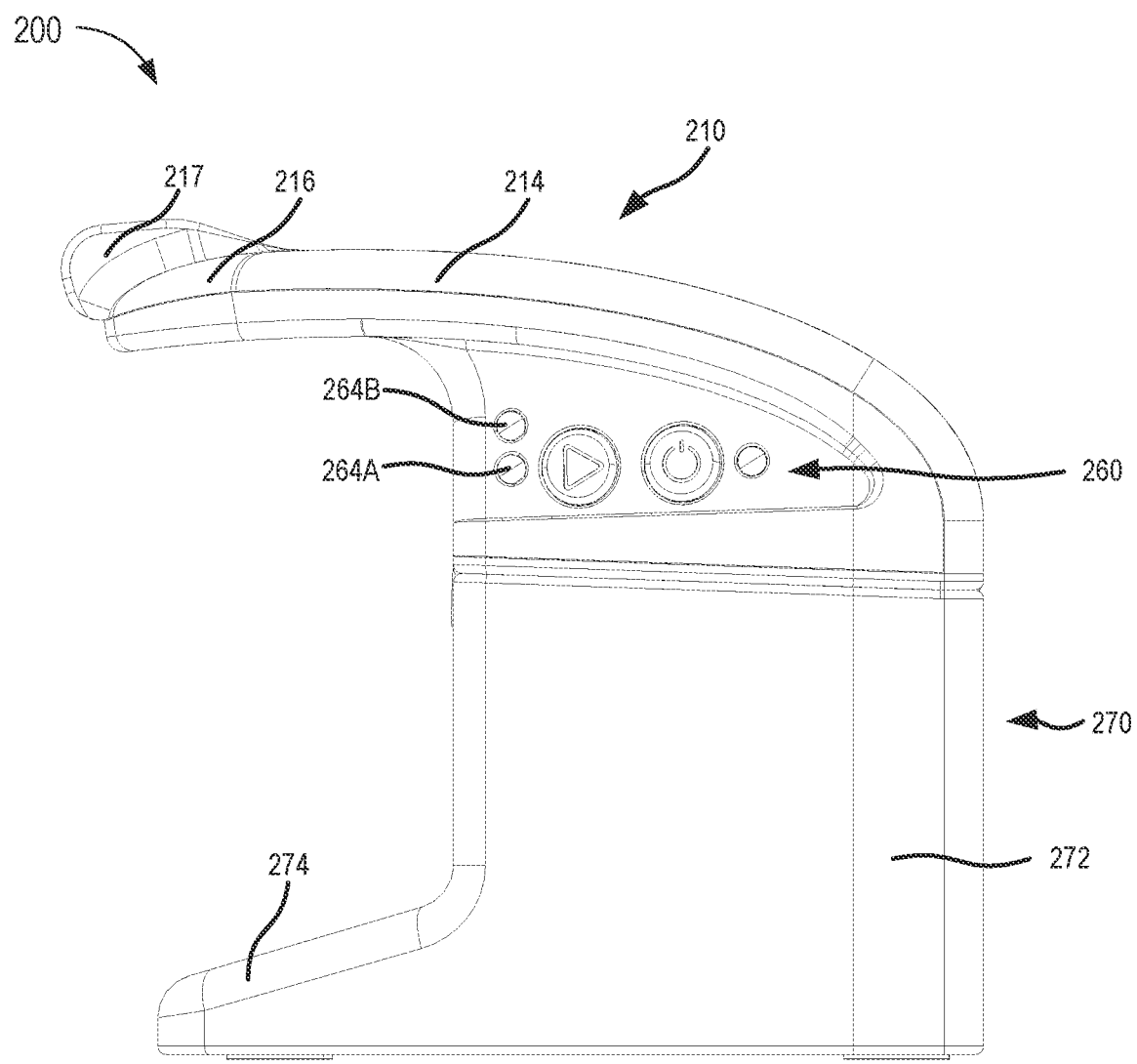
FIG. 4 is a right-side view of the hand warmer device aiding capillary blood collection shown in FIG. 2.
Figure 5:
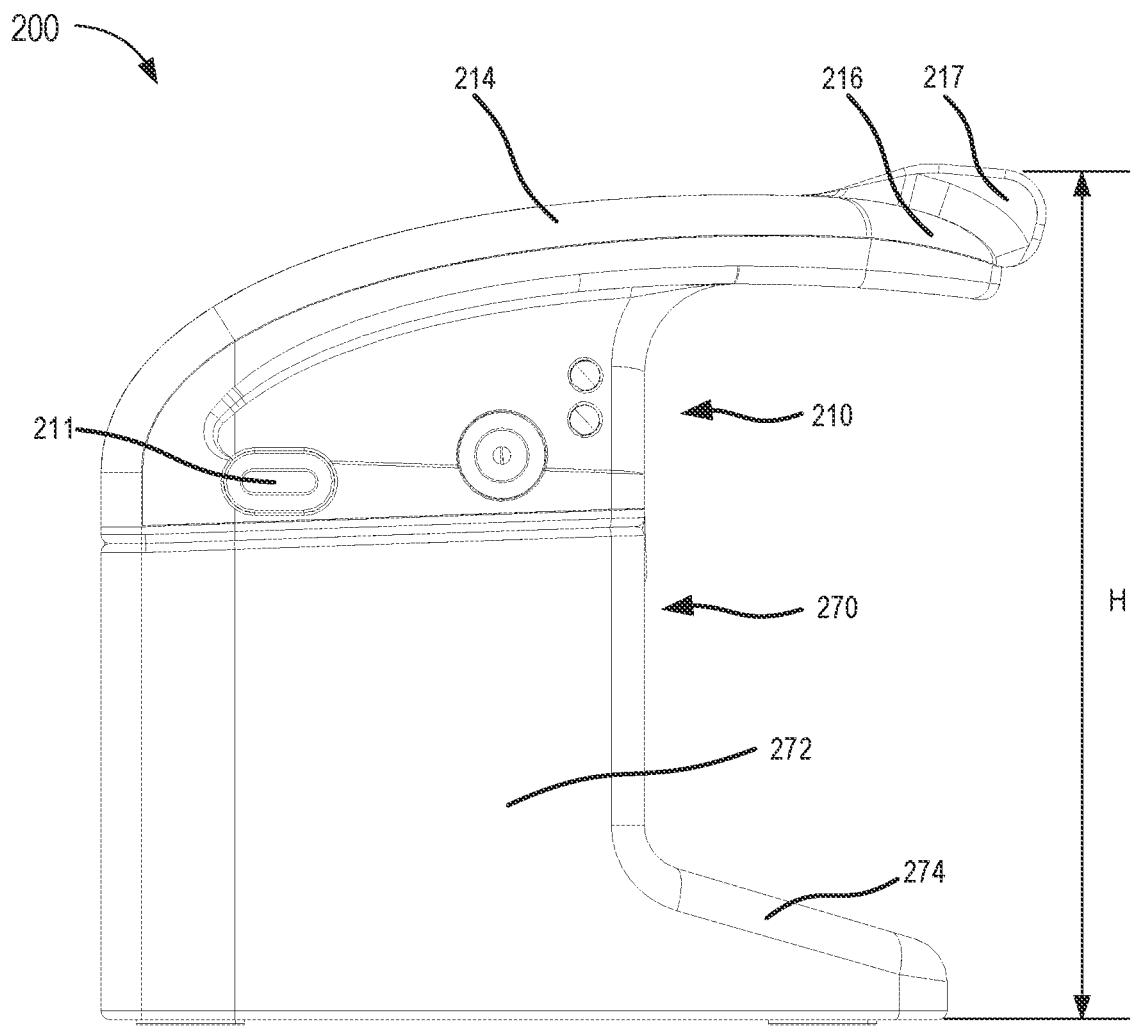
FIG. 5 is a left-side view of the hand warmer device for aiding capillary blood collection shown in FIG. 2.

FIGS. 2-8 illustrate a hand warmer device 200 according to an embodiment. The hand warmer device 200 (also referred to herein as "warmer device" 100) can be the same or similar in form and/or function to the warmer device 100 described above with reference to FIG. 1. For example, as described above with reference to the warmer device 100, the warmer device 200 can be configured to provide a surface in which a hand of a user and/or patient can be received and heated with the purpose of facilitating collection of capillary blood samples. The warmer device 200 includes a housing 210, a heat source 220, a heat exchange component 230, a temperature sensor 240, a sensor 250, a control unit 260 and a stand 270 (although as described in connection with warmer device 100, in some implementations a stand may not be included). In some implementations, portions and/or aspects of the warmer device 200 can be similar to and/or substantially the same as portions and/or aspects of the warmer device 100 described above with reference to FIG. 1. Accordingly, such similar portions and/or aspects may not be described in further detail herein The housing 210 defines an interior volume and/or chamber configured to accommodate multiple components of the warmer device 200 including the heat source 220, the heat exchange component 230, and the temperature sensor 240. FIGS. 2, 4 and 5 show the housing 110 has a shape defined by a rectangular cross-sectional area and a height topped by a curved surface configured to receive a hand of a user and/or patient. More specifically, the side views of the warmer device 200 shown in FIGS. 4 and 5 reveal the curved top area of the housing includes a palm receiving component 214 and a finger receiving component 216 forming an overhang with respect to the interior volume of the housing 210 and the stand 270 which is disposed below the bottom side of the warmer device 200. The housing 210 is shaped and/or configured to achieve a desired positioning of the blood sample collection hand, such that a user and/or patient can comfortably place his/her blood sample collection hand on the housing 110 to heat the hand, while simultaneously allowing a trained healthcare worker and/or technician to initiate other steps of the capillary blood sample collection process such as for example, selecting and preparing the appropriate sample collection tube(s), cleaning and/or disinfecting the blood sample collection area, piercing the blood sample collection area, applying and/or accommodating a suitable collection mechanism (e.g., a collar and/or any other suitable structure that can facilitate withdrawing blood), applying pressure to the pierced area to collect the capillary blood sample, and the actual collection of capillary blood samples. In some implementations, for example, a user's palm can rest on the housing 210 during warming of the palm, while allowing at least one finger to extend beyond an edge of the housing 210 (e.g., overhang), to then allow for simultaneous preparation of and collection from the finger. In that way, the warmer device 200 can facilitate reducing the total amount of time needed to collect a capillary blood sample, preventing potential contamination and/or formation of cloths due to a slow blood collection process.

Figure 6:
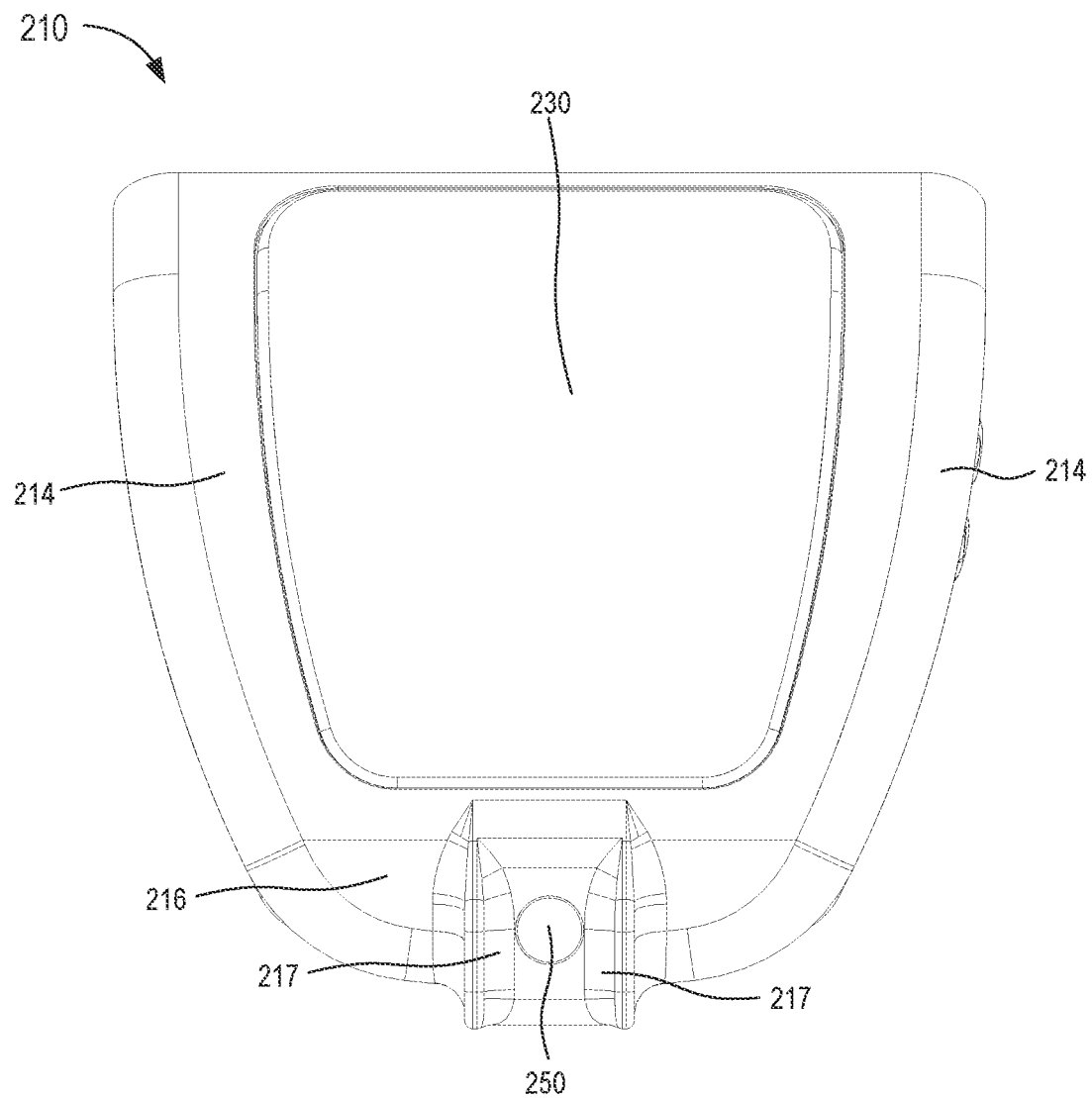
FIG. 6 is a top view of the hand warmer device aiding capillary blood collection shown in FIG. 2

FIG. 2 shows the housing 210 includes a palm receiving portion and/or component 214 and a finger receiving portion and/or component 216 disposed on the top curved surface of the housing 210. The palm receiving component 214 is sized and configured to receive and/or support the palm of a hand of a user and/or patient (e.g., a blood sample collection hand). The palm component 230 can be disposed to facilitate transferring heat from the warmer device 200 to the hand of a user and/or patient. The top view of FIG. 6 shows the palm receiving component 214 includes a central portion that is occupied by the heat exchange surface 230 surrounded by narrow trim (e.g., in some implementations made of the material similar to the material used to make the housing 210). The palm receiving component 214 is shaped to facilitate the intimate contact between a heat exchange surface of the heat exchange component 230 and the palm of a blood sample collection hand. In use, a user and/or patient can accommodate one of his/her hands (e.g., the blood sample collection hand) on the warmer device 200 such that the palm of the blood sample collection hand is disposed over the palm receiving component 214 and in direct contact with the heat exchange surface of the heat exchange component 130.

The finger receiving component 216 is disposed on the top curved surface of the housing 210, adjacent to the palm receiving component 114. The finger receiving component 216 is sized and configured to receive and/or accommodate a finger from the blood sample collection hand of a user and/or patient when the hand is disposed on the adjacent palm receiving component 214. FIGS. 2, 4 and 6 show the finger receiving component 216 has an elongated shape that extends outward (e.g., overhangs) from the rectangular interior volume of the housing 210. The elongated shape of the finger receiving component 216 facilitates receiving and support a finger of a blood sample collection hand of a subject in an extended position and/or predetermined orientation such that the end portion of the finger distal to the palm of the hand (e.g., the distal end portion including a fingernail) is positioned away from the warmer device 200. In the predetermined orientation the distal end-portion of the finger extends away from the warmer device 200 and provides sufficient space and/or access to allow a technician and/or trained healthcare worker to perform one or more steps on the end portion of finger (e.g., by accessing that portion from underneath the finger) prior to and during conducting the collection of capillary blood samples, while the palm of the hand is being simultaneously heated. For example, in some instances the technician and/or trained healthcare worker can disinfect the end-portion of the finger in preparation for a piercing the skin of the finger with a lancet, pierce the skin of the finger, introduce and/or accommodate a suitable blood collection mechanism (e.g., a collar and/or any other mechanism to provide pressure needed to aid the blood collection process), and/or withdraw blood from the pierced skin (proceed to collect blood samples), while the palm of the hand is being heated to facilitate and/or aid the collection of high quality blood samples. The finger receiving component 216 can be configured to receive the finger of a user according to a predetermined orientation that leaves and/or generates a repeatable and/or reproducible space for a technician to perform the steps required to collect blood samples. In that way, every time a user disposes a finger on the finger receiving component 216, the finger is received in the predetermined orientation such that the end-portion of the finger leaves sufficient space for the technician and/or trained healthcare worker to perform the steps required for collection of blood samples.

FIGS. 2-6 show the finger receiving component 216 includes two guides and/or marks 217 that delineate, demarcate, and or define a region, trench, and/or channel in which the finger of the blood sample collecting hand of a user and/or patient needs to be placed during the capillary blood sample collection process. The guides 217 are disposed around the central region of the finger receiving component 217, such that a middle finger of a blood sample collection hand disposed on the warmer device can be easily and comfortably suspended and/or supported with the purpose of measuring a temperature of the finger, and/or conducting one or more preliminary steps in preparation for withdrawing capillary blood samples. Alternatively, in some embodiments the guides 217 can be disposed on around a left-area and/or right-side area of the finger receiving component 216 such that a finger different from a middle finger (e.g., a thumb finger, a ring finger, and index finger or even a little finger) can be supported for measuring a temperature of the finger, and/or conducting one or more preliminary steps in preparation for withdrawing capillary blood samples. FIGS. 3, 4 and 5 show the guides 217 define two creases, protuberances, ridges, bulges and/or the like oriented parallel to each other such that the creases enclose a region, trench, and/or channel between them in which the finger of the blood sample collection hand can be disposed.

Figure 8:
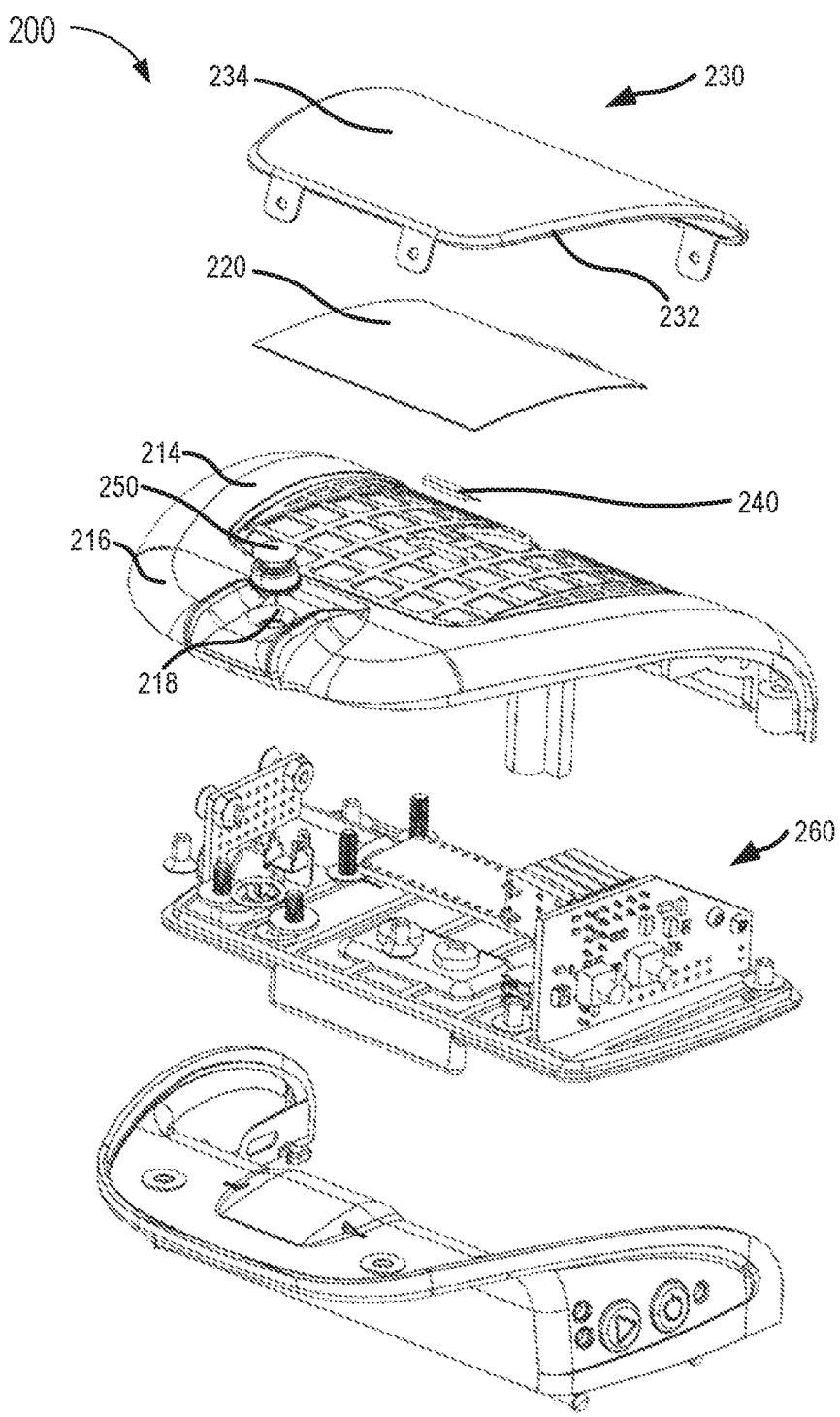
FIG. 8 is a partially expanded perspective view of a portion of the hand warmer device for aiding capillary blood collection shown in FIG. 2, displaying a heater, a heating surface, and a control unit

FIG. 8 shows the finger receiving component 217 includes an aperture, opening, orifice, and/or window 218 in or through which the sensor 250 can be disposed and/or exposed to the user's finger. The aperture 218 of the finger receiving component 216 is a circular opening (although in other implementations it can by any suitable shape, such as, e.g., a shape other than a circle) of a size substantially similar to the size of the sensor 250. In that way, the aperture 218 can accommodate a sensor 215 having a cross-sectional area of dimensions similar to the dimensions of the aperture 218. The sensor 250 can be disposed and/or coupled to the aperture 218 using various coupling mechanisms including, but not limited to bolts, nails, fasteners, welding, brazing, adhesives and/or the like.

FIG. 5 shows the housing 210 includes an electrical interface 211 that can be coupled to an external power source (not shown). The electrical interface 211 can be configured to be electrically coupled and/or connected to and/or otherwise placed in electric communication with the external power source to provide a flow of electric power to one or more components of the warmer device 200 such as the heat source 220, the temperature sensor 240, and/or the control unit 260. The electrical interface may be adaptable to a variety of international voltage and/or current standards. Alternatively, and/or additionally, in some implementations the housing 210 can accommodate and/or house an internal power source such as energy storage devices (permanent and/or easily exchangeable batteries), a solar panel, and/or the like, configured to provide electric power to the one or more components of the warmer device 200.

The heat source 220 is a device configured to generate heat and facilitate transferring the generated heat (via a heat exchange surface of the heat exchange component 130) to a blood sample collection hand of a user and/or patient. The heat source 220 is a resistive film heater 220 configured to flow an electrical current to convert electrical energy into heat through the Joule heating process. Thais to say, the heat source 220 is coupled to the heat exchange component 230, as further described herein. FIG. 8 shows the heat source 220 can be disposed underneath the heat exchange component 230, such that heat generated by the heat source 220 can be rapidly and efficiently transferred to the heat exchange component 230 for heating and/or warming the hand of a user and/or patient. More specifically, the heat source 220 can be disposed and/or located directly underneath the heat exchange component 230 such that a surface of the heat source 220 is placed in direct physical contact with a surface of the heat exchange component 230. By locating the heat source 220 underneath the heat exchange component 230, heat generated by the heat source 220 can be rapidly transferred via one or more of a conductive, convective and/or radiation mechanism, from the heat source 220 to the heat exchange component 230. The heat generated by the heat source 220 can be transferred to the heat exchange component 230 via the surface 232 of the heat exchange component 230, which is disposed adjacent to the heat source 220 and opposite to the heat exchange surface 234, as shown in FIG. 8. The thermal energy received from heat source 220 can then be transported and/or diffused by conductive mechanisms from the surface 232 to the heat exchange surface 234 in which the hand of a user and/or patient can be disposed. In that way, heat generated by the heat source 220 can be used to heat and/or warm a hand of a user and/or patient.

The heat source 220 can be any suitable shape and/or size. In some implementations the heat source 220 can be a rectangular shape having dimensions substantially similar to the dimensions of the heat exchange component 230, a depicted by the heat source 230 in FIG. 8. In such implementations, heat generated by the heat source 220 may be transferred to the heat exchange component ensuring temperature uniformity. In some implementations the heat source 120 can be configured to be light weight and flexible such that the heat source 220 is capable of being bent to conform to irregular shapes, contours, and/or three-dimensional shapes and/or curvatures, of the housing of the warmer device 200 quick thermal response, low thermal mass, low energy consumption, high watt density, and/or wide range of voltage compatibility.

The heat exchange component 230 can be a structure capable of transferring heat from the heat source 220 to a blood sample collection hand of a user and/or patient. FIGS. 2, 6, 7, and 8 show the heat exchange component 230 is a panel, and/or plate having a shape defined by a rectangular cross-section and a curved surface. The heat exchange component 230 is disposed on the hand receiving component 214 of the housing 210, directly over the heat source 230 as described above. The curvature of the curved surface of the heat exchange component 230 can be configured to match the curvature of the hand receiving component 214. The heat exchange component 230 includes a back surface 232 which is configured to be in direct contact with the heat source 220 to facilitate transferring heat generated by the heat source 220. The heat exchange component 230 also includes a heat exchange surface 234 disposed at an opposite side of the heat exchange component 230. The heat exchange surface 234 is configured to be placed directly in physical contact with a blood sample collection hand to a user and/or patient to transfer heat and warm the hand. The heat exchange component 230 can be made of one or more materials having high thermal conductivity such as including, aluminum (Al), aluminum nitride ($AlNiO_3$) copper (Cu), tungsten (W), silicon carbide (SiC), gold (Au), silver (Ag), graphite, and/or Zinc (Zn).

The heat source 220 is coupled to the temperature sensor 240. In some implementations the temperature sensor 240 can be configured to measure the temperature of the heat source 220 and send one or more signals to the control unit 260 such that the control unit 260 can adjust and/or modify the rate of generation of heat in the heat source 220, effectively controlling the temperature of the heat source 220 and thus that of the heat exchange component 230 (e.g., increasing, decreasing and/or maintaining constant the temperature of the heat source 220 and the exchange component 230), as further described herein.

The temperature sensor 240 can be any suitable device configured to measure the temperature of the heat exchange component 230. The temperature sensor 240 can be a thermistor coupled to the heat source 220 to facilitate measuring a temperature of the heat source 220. More specifically, the temperature sensor 240 can be configured to measure a temperature of the heat source 220, which can be associated with a temperature of the heat exchange surface 230 and/or the heat exchange surface 234. The temperature sensor 240 can be disposed in the housing 210, positioned such that at least a portion of the temperature sensor 240 is close contact with the heat source 220, as shown in FIG. 8. In some implementations the temperature sensor 240 can include a thermocouple, a resistance thermometer (RTD), an integrated circuit (IC) temperature or the like. The temperature sensor 240 is electrically and operatively coupled to the control unit 260 such that the control unit 260 can activate and/or control the operation of the temperature sensor 240 to measure a temperature of the heat source 220 and facilitate controlling the heating and cooling of the heat source 220 (and thus the exchange component 230), as further described herein.

The sensor 250 can be a sensor disposed on the finger receiving component 216 and configured to measure a temperature of a finger from a blood collection hand of a user and/or patient. The sensor 250 can be a thermal infrared (IR) sensor disposed on the finger receiving component 216 and positioned and/or located at a short distance from the finger of the blood sample collection hand disposed in the finger receiving component 216. The sensor 250 can be configured to measure the infrared energy emitting from the finger and estimate, based on the measured energy, a temperature of the finger. FIG. 8 shows the sensor 250 is disposed and/or mounted on an opening 218 of the finger receiving component 216 such that the sensor 250 can be used to measure a temperature of a finger of the blood sample collecting hand of a user and/or patient. The opening 218 is located on a region of the finger receiving component 216 such that the sensor 250 can measure a temperature of the finger at a predetermined location and/or point of the finger such as for example, between the first and/or the second knuckle of the hand.

The sensor 250 is electrically and operatively coupled to the control unit 260 such that the control unit 260 can activate and/or control the operation of the sensor 250. In use the sensor 250 can be activated by the control unit 260 to take one or more measurements of the temperature of the finger of a blood sample collection hand. As described above, the temperature of the finger measured by the sensor 250 can be used as a surrogate measurement of the temperature of the blood sample collection hand. The sensor 250 can be configured to communicate the temperature measured to the control unit 260. The control unit in turn can send signals to heat source 220 to increase and/or decrease the generation of heat, as further described herein.

The control unit 260 can be configured to activate and/or control the operation of one or more components of the warmer 200, e.g., by receiving electrical signal(s) from and/or sending electrical signal(s) to other components of the warmer device 200. The control unit 260 can include a processor 162, as well as a memory, and an input/output (I/O) device.

The processor 262 can be any suitable processing device configured to run and/or execute functions associated the warmer device 200. For example, processor can be configured to process and/or analyze sensor data (e.g., received from the sensor 250 and/or the temperature sensor 240), to adjust one or more parameters such as the amount of current passed through the heat source 220 (and thus the amount of heat generated by the heat source 220), and/or the duration (e.g., amount of time) that current passed through the heat source 220, and the temperature of the finger being measured by the sensor 250.

The input/output (I/O) device of the control unit 260 can include one or more components for receiving information and/or sending information to other components of the warmer device 200. The (I/O) device includes a communication interface that can enable communication between the control unit 260 and the heat source 220, and/or the sensor 250. The (I/O) device can include a communication interface that can enable communication between the control unit 260 and a user, patient, and/or a trained healthcare worker. As shown in FIG. 4, control unit 260 can include an (I/O) device comprising multiple dials that can be used to communicate instructions with the warmer device 200. In particular, the (I/O) device can include one or more light indicators (e.g., indicator 264A and indicator 264B) that can be configured to communicate to a user and/or patient when the warmer device 200 has completed a set of instructions and the blood sample collection hand has been warmed and capillary blood samples can be collected, as further described herein.

Figure 7:
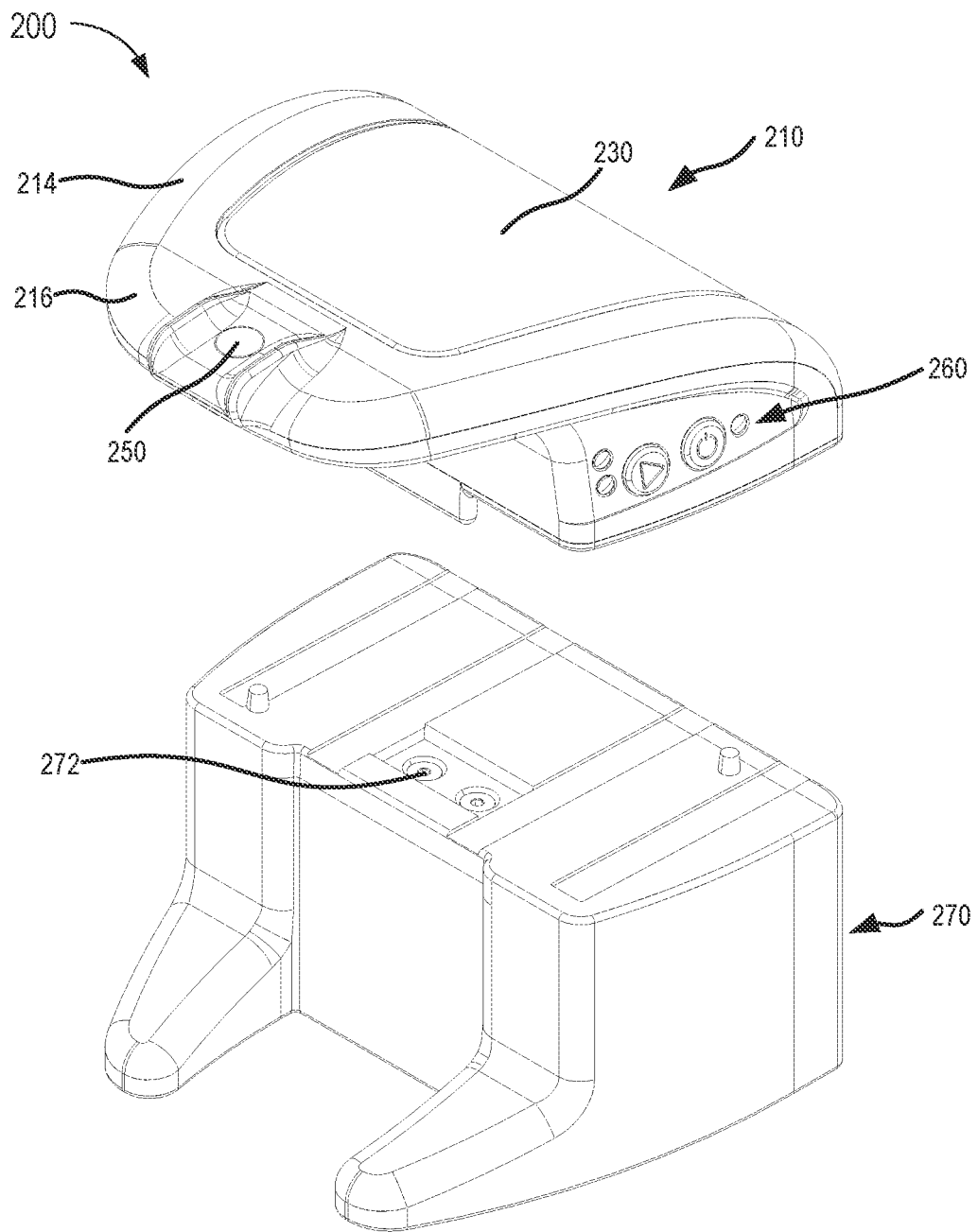
FIG. 7 is a partially expanded perspective view of the hand warmer device aiding capillary blood collection shown in FIG. 2.

The stand 270 is a platform configured to be removably coupled to the warmer device 200 to increase the overall distance and/or height between the surface over which the warmer device 200 is disposed (e.g., a table and/or the ground) and a reference point located on the finger receiving component 216. The stand 270 can improve the ergonomic characteristics of the warmer device 200, such that a user can feel more comfortable while one of his/her hands (the blood sample collection hand) is being processed to obtain blood capillary samples. FIGS. 2, 4, and 5 show the stand 270 includes a main body 272 having a rectangular shape with two support legs 274 protruding from the main body 272. The stand 270 can be coupled to the housing 210 using one or more magnetic couplings 274 disposed at an external surface of the stand 270 configured to be disposed adjacent to a surface of the housing 210 when the stand 270 is coupled to the housing 210. FIG. 7 show the magnetic couplings 274 can be disposed on a top surface of the stand 270 with respect to the ground where the warmer device 200 is located and/or placed. The magnetic couplings 274 can be configured to be coupled to one or more magnetic couplings 219 disposed on a surface of the housing 210, shown in FIG. 8. The stand 270 can be removably coupled to the housing 210 by aligning the magnetic couplings 274 of the stand 270 with the magnetic couplings 219 of the housing 210 and bringing together the stand 270 and the housing 210 such that the attractive magnetic force of the magnetic couplings of the stand 270 and the housing 210 secure and/or attach the stand 270 to the hosing 210. Similarly, the stand 270 can be decoupled from the housing 210 by pulling away the stand 270 from the housing 210 such that the magnetic interaction of the magnetic couplings 219 of the housing and the magnetic couplings 274 of the stand 270 becomes weak, causing the stand 270 to decouple from the housing 210.

FIG. 5 shows the stand 270 can be coupled to the housing 210 such that the distance and/or height "H" between a reference point located on the finger receiving component 216 and the horizontal surface and/or ground is increased. In some implementations the stand 270 can be configured such that the distance H can assume a value or magnitude of no more than about 40 cm, no more than about 30 cm, no more than about 25 cm, no more than about 20 cm, no more than about 15 cm, no more than about 10 cm, inclusive of all values and ranges therebetween. In some implementations the stand 270 can be configured such that the distance H can assume a value or magnitude of at least about 5 cm, of at least about 8 cm, of at least about 12 cm, of at least about 16 cm, of at least about 20 cm, of at least about 24 cm, of at least about 28 cm, of at least about 32 cm, of at least about 36 cm, inclusive of all values and ranges therebetween.

As described above, the warmer device 200 can be used to heat a hand of a user with the purpose of increasing the temperature of the hand and/or a finger of the user and thus facilitating collection of high-quality capillary blood samples. A trained healthcare worker, user and/or patient can place one of his/her hands on the warmer device 200 oriented in such a way that the palm of the hand is disposed on the palm receiving component 214 and at least one of the fingers of the hand is disposed on the finger receiving component 216. The warmer device 200 can then receive one or more set of instructions from the user and/or patient via the I/O device of the control unit 260. For example, in some instances, the set of instructions can cause the warmer device 200 to increase the temperature of the heat source 220 from an initial temperature (e.g., room temperature or initial temperature) to a predetermined target temperature, and then keep the heat source 220 at that predetermined target temperature. The heat source 220 can transfer generated heat to the heat exchange surface 230 to warm and/or heat the hand of the user and/or patient, facilitating collection of high-quality capillary blood samples.

In some implementations, the trained healthcare worker, user and/or patient can input a set of instructions and/or commands which cause the control unit 260 to communicate (e.g., by sending and receiving signals) with the heat source 220 and the temperature sensor 240. The control unit 260 can send one or more signal to the heat source 220 to cause the heat source 220 to flow an electric current and generate heat. The control unit 260 can also cause the temperature sensor 240 to measure a temperature of the heat source 220 and send a signal representative of the measured temperature to the control unit 260. In that way, the control unit 260 can control the heating of the heat source 220 in a closed loop configuration. Alternatively and/or optionally, in some implementations the temperature sensor 240 can be coupled to the heat exchange component 230. In such implementations, the control unit 260 can be configured to cause the temperature sensor 240 to measure a temperature of the heat exchange component 230 and send a signal representative of the measured temperature of the heat exchange component 230 to the control unit 260. In that way, the control unit 260 can monitor the temperature of the heat exchange component 230 and adjust the temperature of the heat source 220 to either increase and/or decrease the rate of heat generation and/or heat transfer to the heat exchange component 230. In some instances, the trained healthcare worker, user, and/or patient can input a set of instructions to cause the heat source 220 to be heated from room temperature to a predetermined target temperature. The temperature sensor 240 can measure the temperature of the heat source 220 and send signals to the control unit 260 such that the control unit 260 can adjust the amount of heat generated by the heat source 220 until the heat source 220 (and thus the heat exchange component 230) reaches the predetermined target temperature. Once the heat source 220 reaches the predetermined target temperature, the control unit 260 can send one or more signal via the interface of the I/O device of the control unit 260 to maintain the heat source 220 at the predetermined target temperature while the hand of the user and/or patient is being warmed and/or heated, as further described herein.

In some instances, a trained healthcare worker, user and/or patient can input a set of instructions such that the control unit 260 maintains the temperature of the heat source 220 (and thus the temperature of the heat exchange component 230) at the predetermined target temperature while the hand of the user and/or patient is being warmed and/or heated and the subsequent blood collection process. For example, in some instances the trained healthcare worker, user, and/or patient can input a predetermined amount of time that the control unit 260 will maintain the temperature of the heat source 220 (after the heat source 220 has reached its predetermined target temperature) to warm and/or heat the hand of the user and/or patient. When the predetermined amount of time has passed, the control unit 260 can send a signal via the I/O device of the control unit 260 to inform the user and/or patient that the hand has been warm and is now ready to initiate collection of capillary blood samples. The control unit 260 can also be configured to maintain the temperature of the heat source 220 (and thus the temperature of the heat exchange component 230) during the subsequent blood collection process, thus eliminating any delay between heat application and collection of blood.

In other instances, a trained healthcare worker, user and/or patient can input a desired temperature for the finger disposed on the finger receiving component 216 (and measured by the sensor 250), and the control unit 260 will maintain the predetermined target temperature of the heat source 220 (and thus the heat exchange component 230) until the finger reaches the desired temperature. Once the finger reaches the desired temperature, the control unit 260 can send a signal via the I/O device of the control unit 260 to inform the user and/or patient that the hand has been warmed is now ready to initiate collection of capillary blood samples.

In yet other instances, a trained healthcare worker, user, and/or patient can input a temperature percent change based on the initial and/or starting temperature of the finger disposed on the finger receiving component 214 measured by the sensor 250. For example, in some instances a user and/or patient can input to the control unit 260 a 20% temperature change with respect to the starting temperature of the finger. The control unit 260 can send a signal to the sensor 250 to measure the initial temperature of the finger of the user disposed on the finger receiving component 216. The control unit 260 can receive a signal from the sensor 250 representative of the measured initial temperature of the finger. Then the control unit 260 can send a signal to the heat source 220 to heat the heat source 220 (and this the heat exchange component 230) to a predetermined target temperature. The control unit can continuously communicate with the heat source 220 and the temperature sensor 240 to heat and/or increase the temperature of the heat source 220 until reaching the predetermined target temperature. The control unit 260 can also receive signals from the sensor 250 representative of the temperature of the finger disposed on the finger receiving component. When the temperature of the finger reaches a 20% temperature increase measured with respect to the initial temperature of the finger, the control unit 260 can first send a signal via the I/O device of the control unit 260 to inform the user and/or patient that the hand has reached the selected temperature % change, and thus the hand has been warm and is now ready to initiate collection of capillary blood samples. In some instances, the trained healthcare worker, user and/or patient can input a rate of change of the finger temperature measured by the sensor 250. For example, in some instances the trained healthcare worker, user and/or patient can input a rate of change of the finger temperature of about 0.2° C./sec. The control unit 260 can send a signal to the heat source 220 to heat the heat source 220 to the predetermined target temperature. The control unit 260 can continuously communicate with the heat source 220 and the temperature sensor 240 to heat and/or increase the temperature of the heat source 220 (and thus the temperature of the heat exchange component 230) until reaching the predetermined target temperature. The control unit 260 can also receive signals from the sensor 250 representative of the rate of change of the finger temperature. When the rate of change of the finger temperature is met and/or exceeded, the control unit 260 can send a signal via the I/O device of the control unit 260 to inform the user and/or patient that the finger has reached and/or exceeded the selected rate of heating of the finger, and thus the hand has been warm and is now reading to initiate collection of capillary blood samples. In some instances, the trained healthcare worker, user, and/or patient can input a rate of change of the heating rate of the finger temperature. That is, the pace at which the heating rate changes or accelerates during heating of the finger. For example, in some instances the trained healthcare worker, user, and/or patient can input a rate of change of the heating rate of about 0.1° C./sec per second (e.g., the heating rate changes from 0.2° C./sec to 0.3° C./sec in one second). The control unit 260 can send a signal to the heat source 220 to heat the heat source 220. The control unit 260 can continuously communicate with the heat source 220 and the temperature sensor 240 to heat and/or increase the temperature of the heat source 220 (and thus the temperature of the heat exchange component 230) until reaching the predetermined target temperature. The control unit 260 can also receive signals from the sensor 250 representative of the pace at which the heating rate of the finger is changing (e.g., the second derivate of the change of temperature with respect to time during heating of the finger). When the pace at which the heating rate changes is met and/or exceeded, the control unit 260 can send a signal via the I/O device of the control unit 260 to inform the user and/or patient that the finger has reached and/or exceeded the selected pace of heating rate of the finger, and thus the hand has been warm and is now reading to initiate collection of capillary blood samples The control unit 260 can be further configured to facilitate a user to use one or more set of instructions to heat and/or warm a blood sample collection hand. For example, a user and/or patient can select a first set of instructions to input a predetermined amount of time that the control unit 260 will maintain the temperature of the heat source 220 (after the heat source 220 has reached a predetermined target temperature). The user and/or patient can also select a second set of instructions to input a desired temperature for the finger disposed on the finger receiving component 216 (and measured by the sensor 250), with the control unit 260 maintaining the predetermined target temperature of the heat source 220 until the finger reaches the desired temperature for the finger. When either the first set of instructions or the second set of instructions are met, the I/O device of the control unit 260 can use an indicator 264A to inform the user and/or patient that the hand is now reading to initiate collection of capillary blood samples. In some instances, the indicator 264A can include a light, configured to turn on when either the first set of instructions or the second set of instructions are met. Alternatively, in other instances indicator 264A can include a light, configured to turn on when both the first set of instructions and the second set of instructions are met, and hand is reading to initiate collection of capillary blood samples.

While various embodiments have been described above, it should be understood that they have been presented by way of example only, and not limitation. While the embodiments have been particularly shown and described, it will be understood that various changes in form and details may be made. Where schematics and/or embodiments described above indicate certain components arranged in certain orientations or positions, the arrangement of components may be modified. Although various embodiments have been described as having particular features and/or combinations of components, other embodiments are possible having a combination of any features and/or components from any of embodiments as discussed above.

The invention claimed is:

1. An apparatus for warming a hand of a user, comprising:
a housing including a palm receiving area and a finger receiving area, the palm receiving area including a heat exchange surface and being configured to receive a palm of the hand of the user such that at least one finger of the hand extends beyond the palm receiving area and across the finger receiving area, the finger receiving area disposed adjacent to the palm receiving area and configured to accommodate a proximal end portion of the at least one finger of the hand in a predetermined orientation, the palm receiving area and the finger receiving area being disposed on an external surface of the housing; and
a heat source disposed in the housing and operably coupled to the heat exchange surface, the heat source configured to generate and transfer heat to the heat exchange surface such that only the palm of the hand is directly heated by the heat exchange surface when the hand is in contact with the heat exchange surface and the at least one finger of the hand extends beyond the palm receiving area, across the finger receiving area, and beyond a terminal edge of the entire apparatus to accommodate manual collection of blood from a portion of the at least one finger spaced distally beyond the terminal edge, the heat source being at least one of a resistive heater or a film heater.

2. The apparatus of claim 1, wherein the finger receiving area defines a trench for receiving the proximal end portion of the at least one finger of the hand of the user.

3. The apparatus of claim 1, further comprising a sensor disposed on the finger receiving area, the sensor configured to measure a temperature of the proximal end portion of the at least one finger of the hand of the user.

4. The apparatus of claim 3, wherein the sensor includes an infrared temperature sensor.

5. The apparatus of claim 1, wherein the heat source is configured to generate heat in a closed loop circuit.

6. The apparatus of claim 1, wherein the heat source includes a resistive film heater.

7. The apparatus of claim 1, further comprising a temperature sensor configured to measure a temperature of the heat exchange surface.

8. The apparatus of claim 1, wherein the predetermined orientation provides a repeatable space for collecting blood samples.

9. The apparatus of claim 1, wherein the predetermined orientation allows access to a distal end portion of the at least one finger of the hand while the hand is being heated.

10. The apparatus of claim 2, wherein the trench is configured to support a palmar side of the proximal end portion of the at least one finger of the hand of the user while providing access to a dorsal side of the proximal end portion of the at least one finger of the hand of the user.

11. The apparatus of claim 3, further comprising a light display and a control unit, the control unit operably coupled to the sensor, the heat source, and the light display, the control unit configured to:
receive signals from the sensor indicative of the measured temperature of the proximal end portion of the finger of the hand of the user;
compare the measured temperature with a desired temperature; and
report to the user, based on the comparison and via the display, whether a blood sample can be collected from a distal end portion of the at least one finger of the hand of the user.

12. The apparatus of claim 9, wherein the distal end portion of the at least one finger includes a fingernail of the hand of the user.

13. The apparatus of claim 9, wherein the distal end portion of the at least one finger includes a portion of the at least one finger that is distal to a proximal end of a fingernail of the hand of the user.

14. The apparatus of claim 1, further comprising a light display and a control unit, the control unit operably coupled to the heat source and the light display, the control unit configured to:
send a signal to the heat source to heat the heat exchange surface to a predetermined temperature for a time period; and
after the time period has passed, report to the user, via the display, that a blood sample can be collected.

15. The apparatus of claim 1, further comprising a stand removably coupled to the housing, the stand configured to increase a height of the apparatus.

16. The apparatus of claim 1, wherein the finger receiving area is configured to provide unrestricted access to a dorsal side of the at least one finger.

17. The apparatus of claim 1, wherein the finger receiving area is configured to support a palmar side of the at least one finger and not constrain a dorsal side of the at least one finger.

18. The apparatus of claim 1, wherein the portion of the at least one finger is not directly constrained when disposed beyond the terminal edge of the entire apparatus.

19. The apparatus of claim 1, wherein the portion of the at least one finger is on a palmar side of the at least one finger.

20. An apparatus for warming a hand of a user, comprising:
a housing including a palm receiving area and a finger receiving area, the palm receiving area including a heat exchange surface and being configured to receive a palm of the hand of the user such that at least one finger of the hand extends beyond the palm receiving area and across the finger receiving area, the finger receiving area disposed adjacent to the palm receiving area and configured to accommodate a proximal end portion of the at least one finger of the hand in a predetermined orientation;
a heat source disposed in the housing and operably coupled to the heat exchange surface, the heat source configured to generate and transfer heat to the heat exchange surface such that only the palm of the hand is directly heated by the heat exchange surface when the hand is in contact with the heat exchange surface and the at least one finger of the hand extends beyond the palm receiving area, across the finger receiving area, and beyond a terminal edge of the entire apparatus to accommodate manual collection of blood from a portion of the at least one finger spaced distally beyond the terminal edge, the heat source being at least one of a resistive heater or a film heater; and a stand removably coupled to the housing and configured to increase a height of the apparatus.

21. The apparatus of claim 20, wherein the stand is configured to modify an orientation of at least one of the palm receiving area or the finger receiving area.

22. The apparatus of claim 20, wherein the stand is removably coupled to a bottom portion of the housing.

23. The apparatus of claim 20, wherein the stand includes one or more legs.

24. The apparatus of claim 20, wherein the stand includes a magnetized coupling configured to be coupled to a magnetized coupling of the housing.

25. The apparatus of claim 20, wherein the predetermined orientation allows manual access to a distal end portion of the at least one finger of the hand while the hand is being heated.

26. The apparatus of claim 20, further comprising a light display and a control unit, the control unit operably coupled to the heat source and the light display, the control unit configured to:
   send a signal to the heat source to heat the heat exchange surface to a predetermined temperature for a time period; and
   after the time period has passed, report to the user, via the display, that a blood sample can be collected.

27. The apparatus of claim 20, wherein the finger receiving area is configured to provide unrestricted access to a dorsal side of the at least one finger.

* * * * *